US005945678A

United States Patent [19]

Yanagisawa

[11] Patent Number: 5,945,678

[45] Date of Patent: Aug. 31, 1999

[54] IONIZING ANALYSIS APPARATUS

[75] Inventor: Yutaro Yanagisawa, Hamamatsu, Japan

[73] Assignee: Hamamatsu Photonics K.K., Hamamatsu, Japan

[21] Appl. No.: 08/858,973

[22] Filed: May 20, 1997

[30] Foreign Application Priority Data

May 21, 1996 [JP] Japan .................................... 8-126147
Oct. 7, 1996 [JP] Japan .................................... 8-266283

[51] Int. Cl.[6] ............................ B01D 59/44; H01J 49/00; H01J 47/00

[52] U.S. Cl. ........................................ 250/423 F; 250/287

[58] Field of Search ............................ 250/423 R, 423 F, 250/288, 287

[56] References Cited

U.S. PATENT DOCUMENTS 4,570,068 2/1986 Sakairi et al. ...................... 250/423 R
4,747,698 5/1988 Wickramasinghe et al. ........... 250/306
4,924,101 5/1990 Sakudo et al. ...................... 250/423 R
5,070,240 12/1991 Lee .......................................... 250/288
5,223,226 6/1993 Wittmer et al. ......................... 250/288
5,306,412 4/1994 Whitehouse et al. ................ 250/423 F
5,307,311 4/1994 Sliwa ...................................... 365/174
5,596,192 1/1997 Waki ....................................... 250/282
5,611,942 3/1997 Mitsui et al. ......................... 250/423 F
5,750,988 5/1998 Apffel et al. ............................ 250/288

FOREIGN PATENT DOCUMENTS 3-285244 12/1991 Japan .
5-62641 3/1993 Japan .
5-82080 4/1993 Japan .
6-223766 8/1994 Japan .
7-23796 1/1995 Japan .
8-148117 6/1996 Japan .

OTHER PUBLICATIONS

Wilm et al, "Analytical Properties of the Nanoelectrospray Ion Source", Analytical Chemistry, vol. 68, No. 1, Jan. 1, 1996, pp. 1–8.

Kebarle et al, "From Ions in Solution to Ions in the Gas Phase The Mechanism of Electrospray Mass Spectrometry", Analytical Chemistry, vol. 65, No. 22, Nov. 15, 1993.

*Primary Examiner*—Bruce C. Anderson
*Attorney, Agent, or Firm*—Pillsbury Madison & Sutro LLP; Intellectual Property Group

[57] ABSTRACT

A needle (22) adapted to advance and retract in z directions is accommodated in an ionization chamber (15), whereas an electrolytic solution (L) containing a sample is supplied into the ionization chamber (15) through a supply tube (18). The supply tube (18) is bored with a hole (20) communicating with the inside of the ionization chamber (15). While a predetermined voltage is applied between the supply tube (18) and the needle (22), the tip of the needle (22) is caused to come close to but not in contact with the electrolytic solution in the hole (20), so as to form a locally raised portion (Taylor cone) in the liquid surface of the electrolytic solution, thereby attaching a droplet containing ions in the electrolytic solution to the tip of the needle (22). After the needle (22) is moved to a predetermined position, $N_2$ gas is jetted against the tip portion of the needle (22), thereby emitting the droplet containing ions attached to the tip of the needle (22) into the ionization chamber (15). Accordingly, the ions can be concentrated and subjected to soft ionization. Thus, an analysis apparatus for improving the ion generating efficiency to be used for mass spectrometry or the like is provided.

36 Claims, 22 Drawing Sheets

PRIOR ART

IONIZING ANALYSIS APPARATUS

BACKGROUND OF THE INVENTION

1. Field of the Invention

The present invention relates to an ionizing analysis apparatus which ionizes (in so-called soft ionization) a hardly volatile macromolecule such as biopolymer, protein, sugar chain, DNA, or drug without decomposing it, and then performs mass spectrometry or the like of this macromolecule.

2. Related Background Art

In the conventional ionizing analysis apparatus for performing mass spectrometry or the like of the above-mentioned hardly volatile macromolecule as a sample, such a technique as laser desorption or electro-spray is used for effecting soft ionization of the sample.

In the laser desorption technique, the sample and a matrix which functions to absorb a laser incident thereon and prevent the sample from decomposing are mixed together, and the resulting mixture is coated on a substrate and dried in the atmosphere so as to prepare an ion source. Thus prepared substrate is attached to the ionizing analysis apparatus, which is then evacuated with a vacuum pump. After a vacuum level reaches a predetermined level, the ion source is irradiated with a laser beam, whereby ions of the matrix and sample are evaporated. As they are introduced into a mass spectrometer and detected by an ion detector, a mass spectrum is obtained. This technique overcomes a problem that, when only a hardly volatile macromolecule as the sample is irradiated with a laser, the soft ionization of the sample cannot be achieved due to the decomposition of the macromolecule.

In the following, an ionizing analysis apparatus using the electro-spray technique will be explained with reference to FIG. 26. An electrolytic solution L containing an ion-dissociated sample is supplied to a capillary 1 having an inner diameter of about 100 μm or less. Due to an electric field generated by a high voltage applied to the capillary 1, a tip portion 2 of the electrolytic solution L attains a needle form. Accordingly, the electrolytic solution L is sprayed from the tip portion 2 so as to be emitted into an atmosphere R as an ion droplet 3 having a diameter of about 1 μm. The atmosphere R is differentially evacuated with a vacuum pump (not depicted) while $N_2$ gas is fed thereto from a predetermined supply port. As shown in FIG. 27, thus emitted ion droplet 3 gradually reduces its volume and surface area as it splits or its solvent evaporates. As the surface area of the ion droplet decreases, ions of the sample or ions of the solvent migrate to the surface of the droplet. When the droplet further reduces the volume such that its radius reaches a predetermined critical level (about 10 nm), the ions are emitted from the droplet (subjected to so-called ion evaporation) due to Coulomb repulsion among the ions in the droplet. As thus emitted ions are introduced into a mass spectrometer 5 via an ion introduction section 4 of the ionizing analysis apparatus and then are detected by an ion detector 6, a mass spectrum is obtained.

In the method using the laser desorption technique, however, the amount of the matrix is as much as $10^6$ times that of the sample, and all of the matrix is evaporated, whereby the efficiency at which the ions of the sample are introduced into the mass spectrometer is $10^{-6}$ to $10^{-10}$, which is very low. Also, in order to prepare the ion source, the mixture of the matrix and sample is coated on the substrate once or several times and dried in the atmosphere after each coating step, the substrate is attached to the ionizing analysis apparatus, and then the ionizing analysis apparatus is evacuated, thereby necessitating a long preparatory time before measurement.

In the method using the electro-spray technique, when the concentration of the sample with respect to the solvent is high, the radius of the ion droplet may not decrease to such an extent that it reaches the above-mentioned critical level, whereby ion evaporation may not occur. Also, when a non-organic solvent such as water is used, the mist-like ion droplet 3 may not sufficiently be emitted from the tip of the capillary 1. In order to overcome such a state where spraying is insufficient, the electric field strength may be raised so as to supply a higher energy for spraying. As the electric field strength increases, however, electric discharge tends to occur. Further, in the electro-spray technique, since not only the sample but also all the solvent is evaporated, and the solvent is removed by differential evacuation, the efficiency at which the sample is introduced into the mass spectrometer is also very low, i.e., $10^{-6}$ to $10^{-10}$.

On the other hand, as disclosed in a publication (M. Wilm et al, *Anal. chem.*, 1996, 68, 1–8), the transfer efficiency can be improved in the electro-spray technique when the diameter of the capillary used therein is reduced. In this case, the efficiency at which the ions are transferred to the mass spectrometer can be increased to about $10^{-2}$. The size of droplet that can be emitted from the capillary with such a small diameter has already reached its limit, however, whereby it is difficult to further improve the transfer efficiency according to this method.

Also, FD (field desorption) technique has been known as a method in which a sample is mounted on a needle, dried, and then is inserted in a vacuum atmosphere, to which a voltage of several kV is applied so as to form an electric field for evaporating ions. This method may not be practical, however, since it requires a duration of about one day for operations such as drying of the sample.

In order to eliminate the complicated operations of the FD technique, proposed (in Japanese Patent Application Laid-Open No. 3-285245) is a method in which, while a liquid chromatography effluent is spouted toward a nozzle, a high voltage is applied to the needle carrying the sample, so as to ionize the sample. In this method, however, the sample-ionizing efficiency is not so high, and abnormal electric discharge may be generated, or the medium itself may be ionized so as to generate a background noise.

On the other hand, Japanese Patent Application Laid-Open No. 8-148117 discloses an ionizing analysis apparatus equipped with a sample-material sampling needle for emitting into a chamber a sample material supplied through a tube. This apparatus is disadvantageous in that the sampling accuracy of the sample material supplied through the tube may be insufficient.

Accordingly, it is an object of the present invention to provide an ionizing analysis apparatus which is able to reduce the measurement time since ions can be generated in a short time, measure the ions with a high sensitivity, yield a high efficiency at which the ions are introduced into a mass spectrometer, and operate continuously.

SUMMARY OF THE INVENTION

In order to attain the above-mentioned object, the present invention is configured as follows.

The present invention provides an ionizing analysis apparatus which ionizes a sample material contained in an electrolytic solution in a chamber, emits thus obtained ion, and then detects thus emitted ion. This apparatus comprises a needle disposed within the chamber; takeout means for taking out a droplet of the electrolytic solution by the needle; and emitting means for emitting the droplet into the chamber by the gas jetting out against the droplet taken out by the takeout means preferably with applying a predetermined voltage, corresponding to a charge polarity of the ion in the droplet taken out, to said needle.

According to this apparatus, a minute droplet containing the ion in the electrolytic solution can be taken out by the needle. And since a gas is jetted against the needle so as to emit the droplet into the chamber, a trace quantity of the sample ion can be sampled.

The ionizing analysis apparatus in accordance with the present invention may comprise a supply tube which supplies the electrolytic solution into the chamber and has an opening within the chamber; a needle having a tip disposed so as to oppose to the opening within the chamber; a nozzle for jetting out a gas against any region between the tip of the needle and the opening from a direction substantially orthogonal to the longitudinal direction of the needle; takeout means for taking out a droplet of the electrolytic solution by the needle; and emitting means for emitting the droplet into the chamber by the gas jetting out from the nozzle against the droplet taken out by takeout means or the needle having the tip to which the droplet is attached.

Since a needle is disposed so as to oppose to the opening of supply tube located in the chamber, and a droplet containing the ion in the electrolytic solution is taken out by this needle, minute droplets can be taken out. Also, since a gas is jetted against at least one of the droplet and needle so as to emit the droplet into the chamber, a trace quantity of the sample ion can be sampled.

In the present invention, the emitting means may further comprise means for applying a predetermined voltage, which corresponds to the charge polarity of the ion in the droplet taken out, to the needle.

In this case, since an electric repulsion is applied between the taken-out droplet and the needle, the droplet can efficiently be emitted from the needle.

In the present invention, the emitting means may further comprise means for intermittently emitting the gas.

In this case, since the emitting means intermittently jets out the gas against at least one of the attached droplet and needle, the droplet is emitted from the needle tip only at a predetermined time, whereby ions can intermittently be generated in the chamber.

The present invention may further comprise a skimmer disposed in the chamber so as to oppose to the nozzle across the needle and opening, the skimmer having an opening portion substantially at the center thereof and a gas emitting port disposed around the opening portion so as to be directed toward the nozzle.

In this case, since the gas is jetted against at least one of the droplet and needle so as to emit the ion, and the gas is jetted out from around the opening portion of the skimmer so as to introduce the emitted ion into the opening portion of the skimmer, the emitted ion can be converged onto the opening portion of the skimmer due to a curtain of gas jetted out from around the opening portion of the skimmer, thereby enhancing the transfer efficiency of the emitted ion.

In the present invention, the takeout means may further comprise means for applying, between the needle and the opening, a predetermined voltage opposite to the charge polarity of the ion in the electrolytic solution.

In this case, in response to the charge polarity of the ion in the electrolytic solution, a predetermined voltage with a polarity opposite thereto is applied between the needle and the opening, whereby a locally raised portion (Taylor cone) is generated in its liquid surface as the electrolytic solution is electrically attracted to the needle. Accordingly, minute droplets are easily attached or attracted to the needle, and the charge polarity of the ion contained in the droplets can be selected. Also, since the Taylor cone is generated as a predetermined voltage is applied to the needle, the attachment or attraction of the droplet to the needle can be controlled as the voltage is changed.

In the present invention, the takeout means may further comprise means for generating a Taylor cone by vibrating the tube so as to vibrate the liquid surface of the opening.

In this case, since the electrolytic solution is vibrated so as to generate a Taylor cone, and the distance between the needle and the liquid surface is changed due to the vibration of the liquid surface, minute droplets can be attached or attracted to the needle. Also, since the Taylor cone is generated as the liquid surface is vibrated with a vibrator, the attachment or attraction of the droplet to the needle can be controlled as the vibration of the vibrator is changed.

In the present invention, the takeout means may further comprise means for bringing the liquid surface of the opening into contact with the tip of the needle by vibrating the tube so as to vibrate the liquid surface.

In this case, since it is unnecessary for the needle to move in order to take out the droplet, the apparatus can be simplified.

In the present invention, the takeout means may further comprise means for temporarily bringing the tip of the needle into contact with or close to the electrolytic solution by moving the needle in its longitudinal direction.

In this case, since the needle is moved so as to be temporarily in contact with or close to the electrolytic solution, the droplet is attached to the tip of the needle, whereby the droplet generation can be controlled as the movement of the needle is regulated.

In the present invention, the takeout means may further comprise vibrating means for vibrating the needle so as to temporarily bring the tip of the needle into contact with or close to the electrolytic solution.

In this case, since the needle is vibrated so as to be temporarily in contact with or close to the electrolytic solution in order to take out the droplet, the droplet can be taken out periodically and repeatedly.

The vibrating means may be constituted by a ultrasonic vibrator.

In this case, the vibration frequency can easily be controlled.

In the present invention, at least a portion of the surface of the needle may be coated with a material selected from the group consisting of dielectric materials, insulating materials, materials repellent to the electrolytic solution, and materials absorbing the electrolytic solution.

In this case, the droplet can easily be attached to or emitted from the needle.

In the present invention, the needle may have a constricted portion near the tip portion between the tip of the needle and the base portion of the needle.

In this case, the droplet can be easily attached to the needle tip.

The ionizing analysis apparatus in accordance with the present invention may comprise a supply tube which supplies the electrolytic solution into the chamber and has an opening within the chamber; a needle which is disposed in the tube, has a tip projecting into the chamber through the opening, and is movable in the longitudinal direction thereof; and a nozzle for jetting out a gas against the tip of the needle from a direction substantially orthogonal to the moving direction of the needle.

In this case, the needle projects into the chamber from within the supply tube in a state where the electrolytic solution is attached to the tip. As this droplet is fed into the chamber by the gas, the sample is ionized.

The ionizing analysis apparatus in accordance with the present invention may comprise a supply tube which supplies the electrolytic solution into the chamber and has an opening within the chamber; a first needle in which at least a tip thereof is disposed within the chamber; a second needle which has a tip opposed to the tip of the first needle and is disposed within the tube so as to be relatively movable with respect to the first needle; and a nozzle for jetting out a gas against the tip of the second needle from a direction substantially orthogonal to the moving direction of the second needle.

In this case, since the tips of first and second needles are opposed to each other, and the first and second needles are relatively movable with respect to each other, the sample material existing in the tube can be taken out therefrom with a high accuracy.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
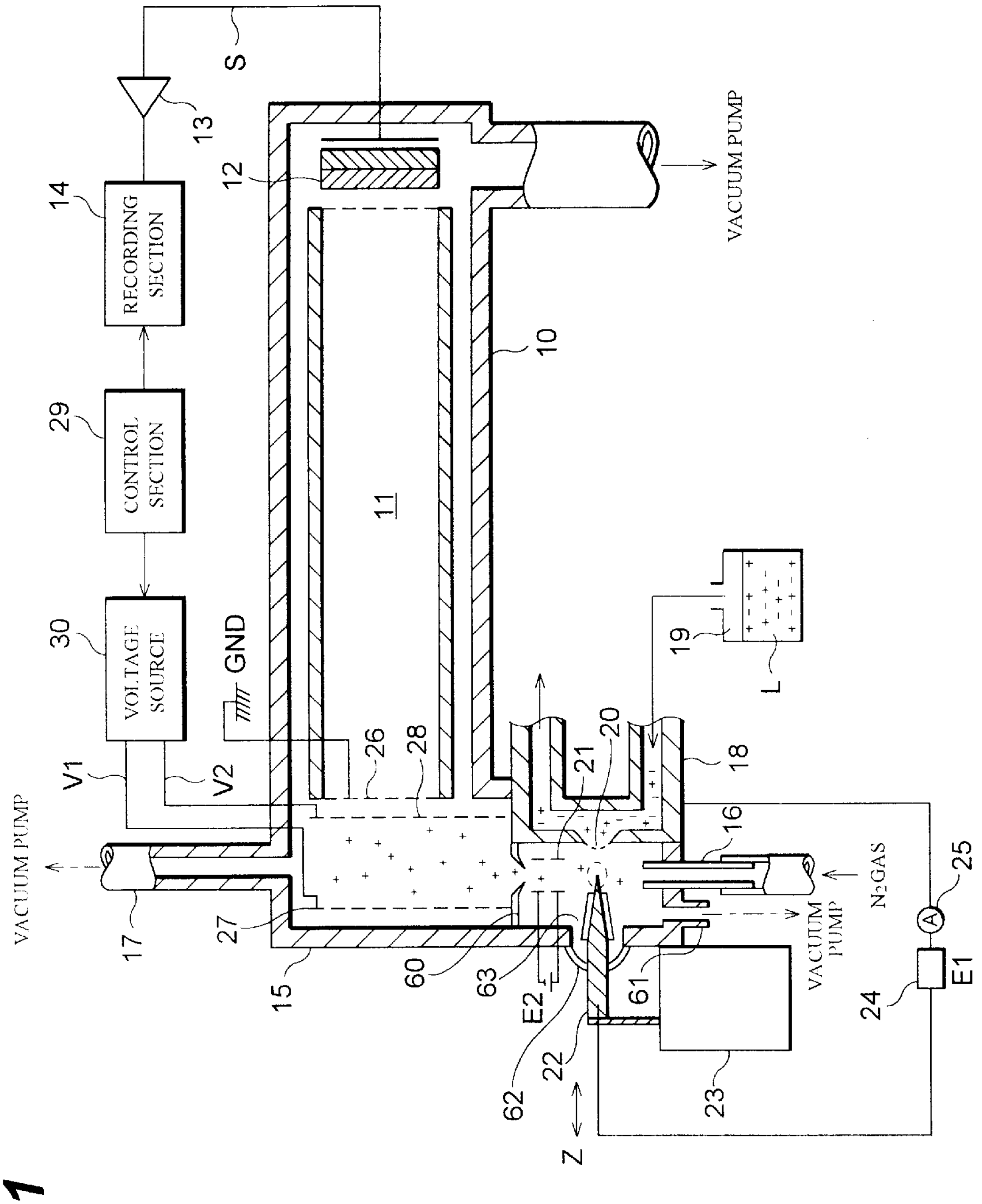
FIG. 1 is a vertical cross-sectional view showing the configuration of the ionizing analysis apparatus in accordance with a first embodiment of the present invention.

In the following explanation, "electrolytic solution" refers to a so-called sample solution which is prepared when a material (e.g., biological cell or other material), as a sample to be measured, is mixed with a solvent. Explained in the description of the preferred embodiments are ionizing analysis apparatus for receiving an electrolytic solution in a state where a sample to be measured is dissociated into anions and cations, collecting the ions of the sample to be measured from this electrolytic solution, and emitting thus collected ions into a mass spectrometer.

First Embodiment

An embodiment in which the ionizing analysis apparatus of the present invention is applied to a TOF (time of flight) mass spectrometer will be explained with reference to the attached drawings.

First, with reference to FIG. 1, a schematic configuration of the TOF mass spectrometer will be explained. Within an airtight container 10 which is evacuated with a vacuum pump (not depicted), a drift region 11 is disposed. Behind the drift region 11, a microchannel plate (MCP) 12 having an electron-multiplying function, as an ion detector, is disposed so as to oppose thereto, such that the ion entering the drift region 11 from the front side (left side in the drawing) thereof passes through the drift region 11 so as to reach the MCP 12. A detection signal S outputted from the anode of the MCP 12 is amplified by a preamplifier 13 and then is recorded in a recording section 14 which is constituted, for example, by a transient recorder which enables high-speed recording.

The ionizing analysis apparatus of the present invention has a container-like ionization chamber 15 integrally connected to the container 10 in front of the drift region 11. This ionization chamber 15 also has an airtightness. From a supply port 16 disposed at the lower end of the ionization chamber 15, $N_2$ gas is fed into the ionization chamber 15, while the ionization chamber 15 is evacuated with a vacuum pump (not depicted) through an upper end port 17 and a lower end port 61. As a substitute for $N_2$ gas, any nonvolatile gas may be fed from the supply port 16. The diameter of the tip of supply port 16 on the side of the ionization chamber 15 is preferably 1 $\mu$m to 50 $\mu$m.

Disposed on a side face in the lower portion of the ionization chamber 15 is a supply tube 18 for supplying an electrolytic solution L, which is fed to the supply tube 18 by a syringe pump 19 or the like. One side of the supply tube 18 is bored with a minute hole 20 communicating with the inside of the ionization chamber 15. Also, a hole 63 is bored at a position opposing to the hole 20.in an inner face of the ionization chamber 15. Through the hole 63, a needle 22 is disposed such that a tip thereof opposes to the hole 20 with a predetermined distance therebetween. The gap between the needle 22 and the hole 63 is sealed with a flexible sealant 62 such that the needle 22 is movable in right and left directions (directions of z in the drawing) within the range of about 1 μm to several ten μm. Since one end of the needle 22 is connected to a piezoelectric element or ultrasonic vibrating element accommodated in a moving device 23, the movement of the needle 22 in the right and left directions is controlled by operations of such an element. Between the needle 22 and the supply tube 18, a variable voltage source 24 and an ammeter 25 are connected in series. The variable voltage source 24 can change control voltage E1 within a range extending from minus to plus. Accordingly, it can output the control voltage E1 such that the potential of the supply tube 18 is higher or lower than that of the needle 22, or output the control voltage E1 (E1=0 V) such that they have the same potential, while their voltage levels can appropriately be set.

Above the needle 22 within the ionization chamber 15, a hollow cylindrical grid 21 is secured so as to oppose to the supply port 16. Further, above the grid 21, grids 27 and 28 are disposed in parallel with each other so as to oppose to a grid 26 disposed in front of the drift region 11. The grid 26, together with the drift region 11, is set to the earth potential (0 V =GND). Since the grids 27 and 28 are connected to a voltage source 30 which is regulated by a control section 29 made of a computer system, pulse control voltages V1 and V2 (wherein 0<V1<V2) can be applied thereto at a predetermined timing. As will be explained later, when the ions of sample are accumulated between the grids 27 and 28, and the predetermined pulse control voltages V1 and V2 are respectively applied to the grids 27 and 28, the cations are accelerated toward the grid 26 so as to be fed into the drift region 11, thereby being subjected to mass spectrometry or the like.

Below the grids 27 and 28 and above the grid 21, a skimmer 60 is secured within the ionization chamber 15. The skimmer 60 has an opening portion near its center. Preferably, the center of the opening portion is aligned with the center axis of the supply port 16. The diameter of the opening portion of the skimmer 60 is preferably 20 μm to 50 μm. Within this range, the degree of vacuum of the ionization chamber 15 on the side of the grids 27 and 28 can be maintained at $10^{-5}$ to $10^{-6}$ even when the ionization chamber 15 is at the atmospheric pressure on the side of the grid 21.

Figure 2:
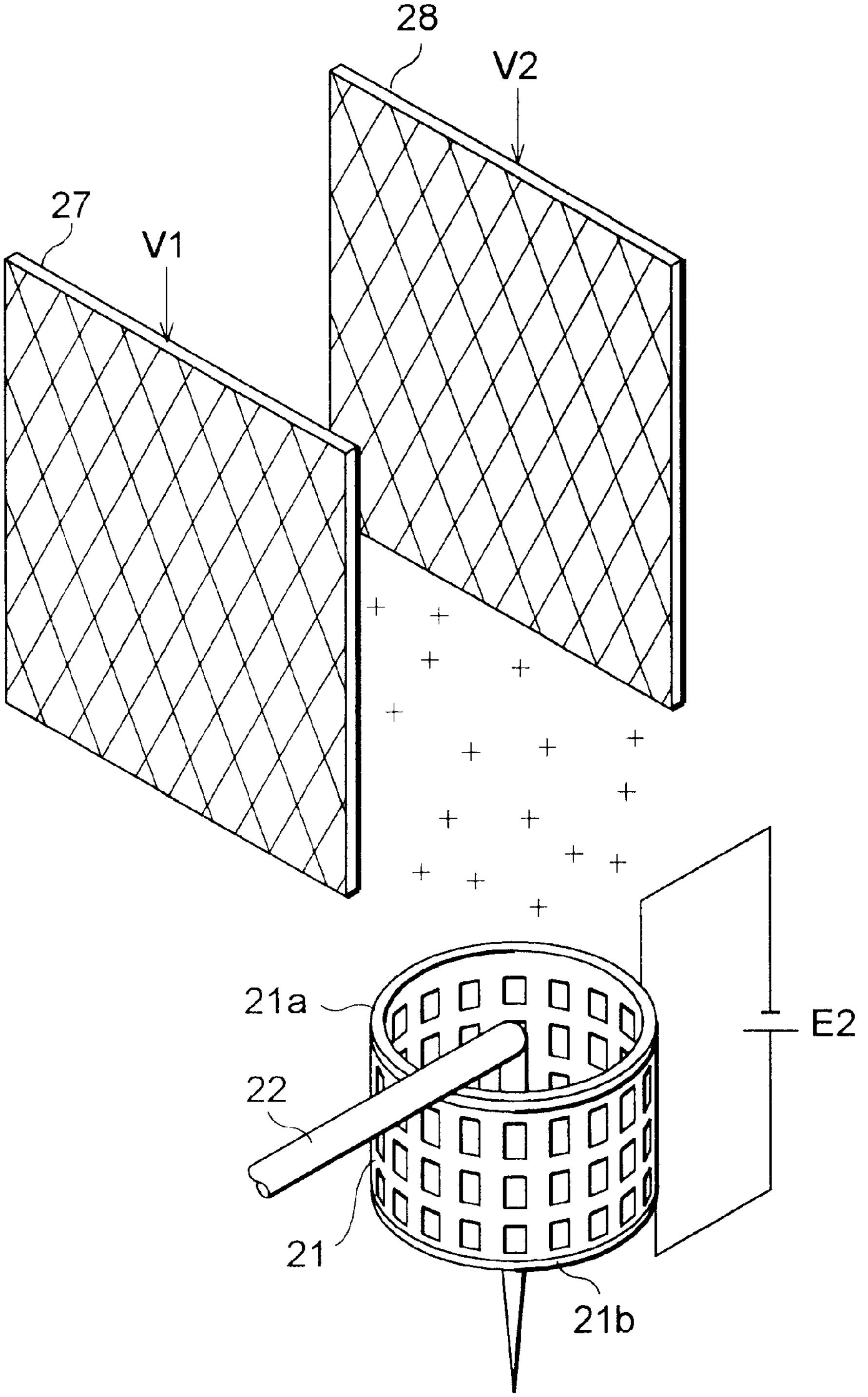
FIG. 2 is an enlarged perspective view showing the configuration of grids in FIG. 1.

Further, the configuration of the grids 21, 27, and 28 will be explained with reference to FIG. 2. In order to form the grid 21, the circumferential wall of a cylindrical tube made of an insulating material is bored with a number of holes by laser processing, and then a conductive coating is applied to the whole surface thereof. It is sufficient for the grid 21 to have an inner diameter which allows the needle 22 to be inserted therein. For example, it is preferably about 10 μm to about 100 μm. Also, when a voltage E2 is applied between upper and lower end portions 21*a* and 21*b* of the grid 21, a predetermined electric field gradient is generated within the cylinder of the grid 21. When the cations in the sample are to be processed, the voltage E2 for making the potential of the lower end portion 21*b* higher than that of the upper end portion 21*a* is employed as shown in FIG. 2. When the anions in the sample are to be processed, the voltage E2 for making the potential of the lower end portion 21*b* lower than that of the upper end portion 21*a* is employed. The grids 27 and 28 are respectively formed by metal nets in parallel with each other.

Figure 3:
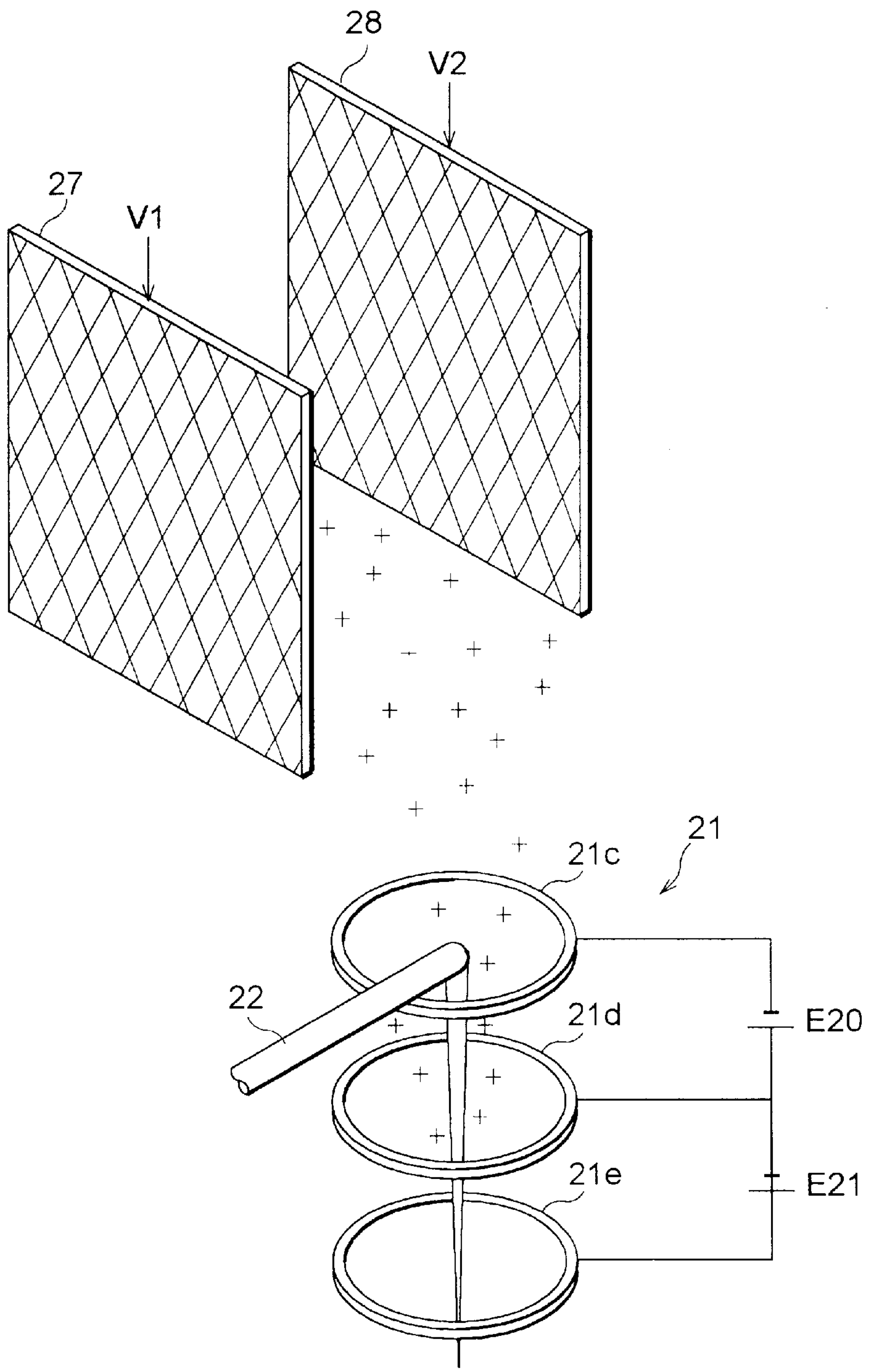
FIG. 3 is an enlarged perspective view showing another configuration of the grids in FIG. 1.

FIG. 3 shows another configuration of the grid 21. In FIG. 3, the grid 21 is constituted by a plurality of metal rings 21*c* to 21*e* arranged in z direction in parallel with each other with predetermined intervals. In this grid 21, as predetermined voltages E20 and E21 are applied between the metal rings 21*c* to 21*e*, a predetermined electric field gradient is generated in these metal rings. In the configuration of the grid shown in FIG. 3, when the cations in the sample are to be processed, the voltages E20 and E21 are respectively applied between the metal rings 21*c* and 21*d* and between the metal rings 21*d* and 21*e* such that the metal ring 21*c* has the lowest potential among them. When the anions in the sample are to be processed, the voltages E20 and E21 are respectively applied between the metal rings 21*c* and 21*d* and between the metal rings 21*d* and 21*e* such that the metal ring 21*c* has the highest potential among them.

Without being restricted to the configurations shown in FIGS. 2 and 3, the grid 21 may have any configuration as long as it can form an electric field gradient for drawing out a predetermined ion generated at the tip portion of the needle into the space between the grids 27 and 28. Also, without being restricted to the configuration shown in FIG. 2, the grids 27 and 28 may have any configuration as long as it can receive the predetermined pulse control voltages V1 and V2 and accelerate a predetermined ion into the drift region.

In the following, operations of thus configured embodiment will be explained. Here, the case where cations are subjected to mass spectrometry or the like will be explained as an example. Accordingly, the voltage E2 is assumed to be set such that the upper and lower end portions 21*a* and 21*b* of the grid 21 have lower and higher potentials, respectively.

Figure 4:
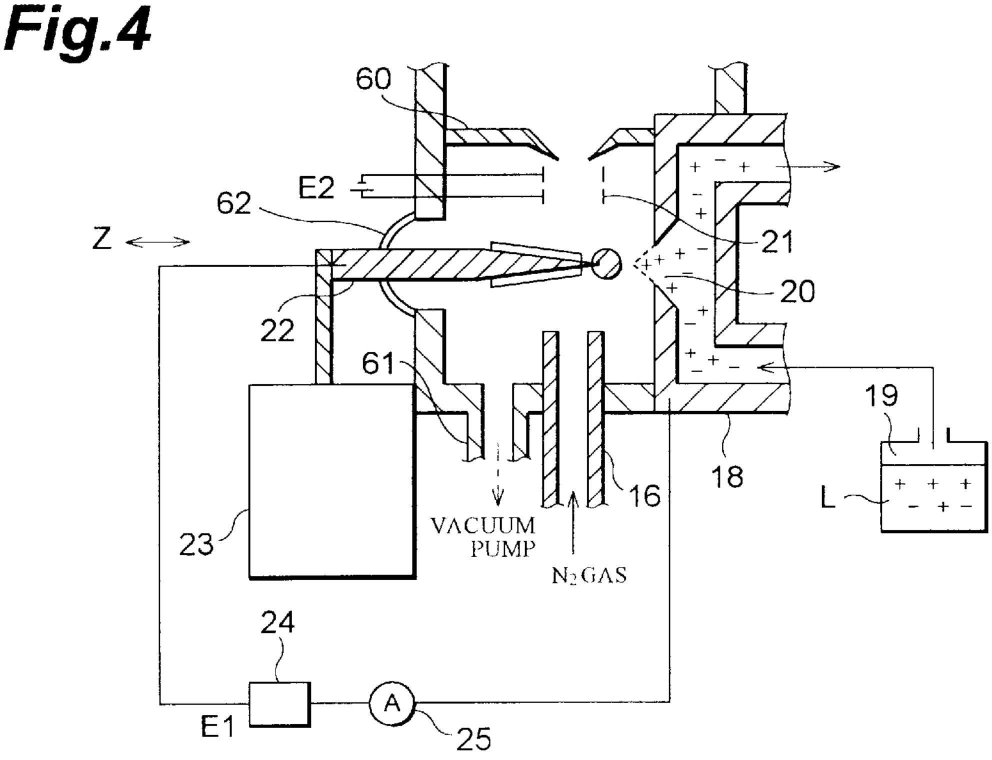
FIGS. 4 to 7 are explanatory views for explaining operations in the first embodiment.

As shown in FIG. 4, in the state where the electrolytic solution L flows into the supply tube 18, when the voltage E1 is applied between the needle 22 and the supply tube 18, and the needle 22 is moved toward the minute hole 20, the liquid surface of the electrolytic solution L in the area of the minute hole 20 is locally attracted by the voltage E1 so as to form a conically raised portion. Due to this raised portion (Taylor cone), a droplet of the electrolytic solution L attaches to the tip of the needle 22. Here, since the polarity of the control voltage E1 is set such that the potential of the supply tube 18 is higher than that of the needle 22, the cations in the sample migrate to the tip of the needle 22 due to electrophoresis, whereby the droplet with concentrated cations attaches to the tip of the needle 22. In order to stably form a locally raised portion (Taylor cone) in the liquid surface of the electrolytic solution L, the voltage E1is preferably about several ten V to 300 V.

Figure 5:
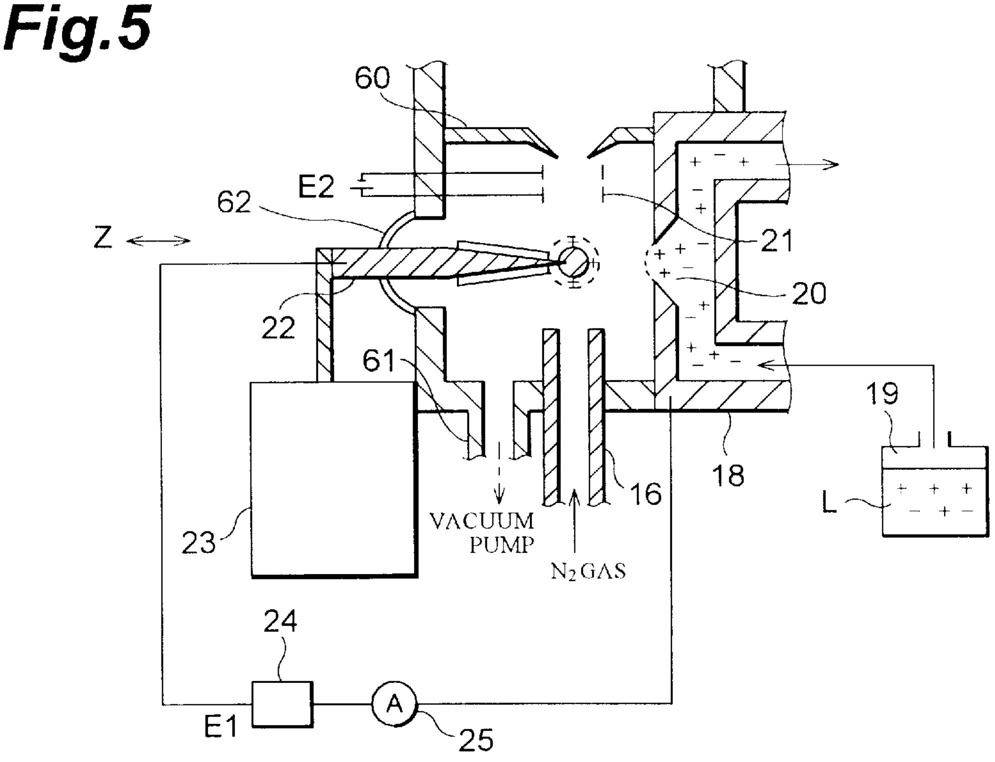

Then, as shown in FIG. 5, when the needle 22 is pulled out from the hole 20 and retracted to a predetermined position while E1 is continuously applied thereto, the droplet containing highly concentrated cations remains attaching to the tip of the needle 22.

Figure 6:
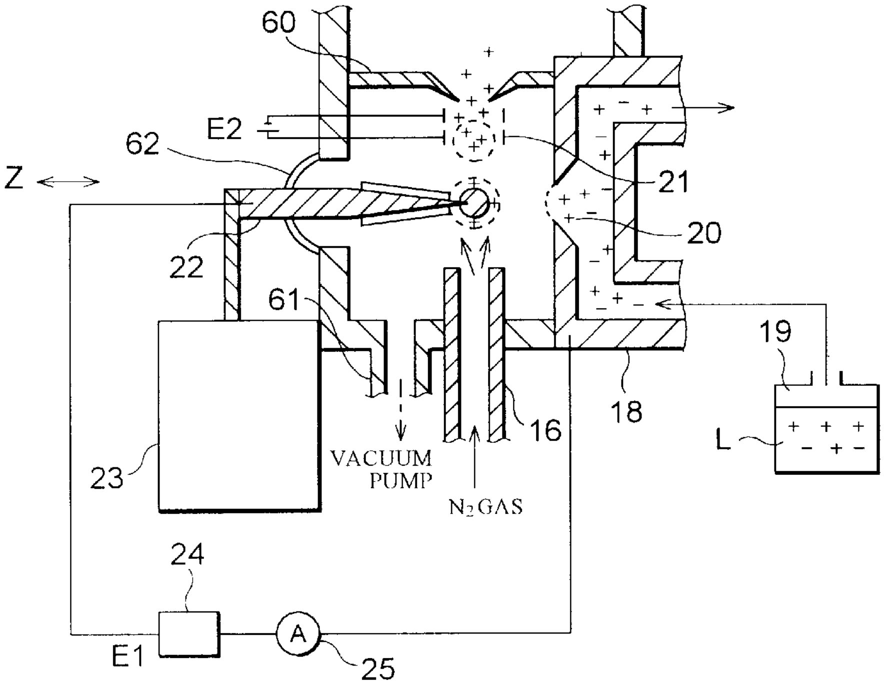

After the needle 22 is retracted to the position where the tip thereof is placed on the center axis of the supply port 16, the polarity of the control voltage E1 is reversed so as to be set such that the needle 22 has a positive voltage with respect the supply tube 18, and the $N_2$ gas is jetted out from the supply port 16 against the tip of the needle 22. In this case, the cations attached to the needle 22 are emitted therefrom not only as the droplet is blown away by the $N_2$ gas jetted out from the supply port 16 but also due to repulsion for the voltage applied to the needle 22, ion evaporation, or their own Coulomb repulsion. According to the electric field gradient of the grid 21, as shown in FIG. 6, thus emitted cations pass through the skimmer 60 so as to migrate to the gap between the grids 27 and 28.

Alternatively, after the needle 22 is retracted to the position where the tip thereof is placed on the center axis of the supply port 16, the $N_2$ gas may be jetted out from the supply port 16 against the tip of the needle 22 without the control voltage E1 being reversed as in the case of this embodiment. The voltage E1 may be 0 V as well. In these cases, the cations attached to the needle 22 are emitted therefrom not only as the droplet is blown away by the $N_2$ gas jetted out from the supply port but also due to ion evaporation. Thus emitted cations migrate to the gap between the grids 27 and 28 as in the case discribed above.

Referring to FIG. 1, the cations thus emitted and migrated to the gap between the grids 27 and 28 is accelerated when the predetermined pulse control voltages V1 and V2 are respectively applied to the grids 27 and 28, thereby moving to the drift region 11 of the TOF mass spectrometer. In the TOF mass spectrometer, the ions to be measured have different velocities of flight in the drift region 11 according to their ratio of charge to mass, whereby their time of flight in the drift region varies. Accordingly, when their time of flight is measured, the mass spectrum can be determined. Namely, when the cations that have reached the MCP 12 are detected in terms of time elapsed after the application of the pulse control voltages V1 and V2, and thus detected signal S is recorded in the recording section 14, the mass spectrum of the sample is determined.

Also, when the needle 22 comes closer to the electrolytic solution L supplied to the supply tube, while a voltage is applied to the needle 22, so as to generate a Taylor cone in the liquid surface of the electrolytic solution L, a minute droplet is emitted from the tip of the Taylor cone into the atmosphere. Accordingly, the ions can be drawn into the atmosphere also when the $N_2$ gas is jetted out against thus emitted droplet.

Thus, in this embodiment, in which a supply tube having a minute hole with a diameter of several $\mu$m is provided, a needle is disposed so as to oppose to the minute hole, and a voltage is applied between the needle and the supply tube, so that a droplet attaches to the tip of the needle due to the resulting electric field, the droplet can be taken out from the minute hole, which has not been possible in the conventional electro-spray technique. Also, a minute droplet, which has not conventionally been available, can be formed. When the gas is jetted out against the tip of the needle so that the ions are emitted from the latter, a trace quantity of ions can be emitted. Accordingly, almost all the ions can directly be introduced into the mass spectrometer or the like. Further, since a predetermined voltage is applied between the needle 22 and the supply tube 18 so as to attract ions having a predetermined charge polarity, a droplet in which the ions having a predetermined charge polarity are concentrated can be attached to the tip of the needle 22. Accordingly, even a trace quantity of ions contained in the electrolytic solution can be taken out.

The operations of the present invention shown in FIGS. 1 and 4 to 6 can be repeated. For example, a piezoelectric vibrator or the like may be used as the moving device 23 for the needle 22 so as to repeatedly move the needle 22 in z directions at a predetermined frequency. Here, a frequency of 1 kHz to 100 kHz is preferable for stably forming a locally raised portion (Taylor cone) in the liquid surface of the electrolytic solution.

When the skimmer 60 is provided, the vacuum level in the portion of the ionization chamber on the side of the grids 27 and 28 can be kept at about $10^{-5}$ to $10^{-6}$. Accordingly, as the pulse control voltages V1 and V2are applied thereto, almost all the emitted ions can be transferred to the mass spectrometer.

The method of attaching the droplet containing cations to the tip of the needle 22 should not be restricted to that shown in FIG. 4. For example, in the state where the electrolytic solution L flows into the supply tube 18, the voltage E1 may be applied such that the potential of the supply tube 18 is higher than that of the needle 22, and the needle 22 may be brought into contact with the liquid surface of the electrolytic solution L in the hole 20 and then is retracted, thereby attaching a droplet to the tip of the needle 22. Since the cations are attracted to the liquid surface near the needle 22 due to the electric field formed by the voltage E1 and attain a high concentration, a droplet containing a high concentration of cations can be attached to the tip of the needle 22. Alternatively, without the voltage E1 being applied between the needle 22 and the supply tube 18, the needle 22 may be brought into contact with the liquid surface and then be retracted such that the needle 22 is temporarily in contact with the liquid surface, thereby attaching the droplet to the tip of the needle 22.

Further, when the control voltage E1 having the same polarity as the charge of the sample ions is applied between the needle 22 and the supply tube 18, and the needle 22 is moved, due to the resulting change in the distance between the needle 22 and the liquid surface and due to the electric field formed by the voltage, a locally raised portion (Taylor cone) can be formed in the liquid surface of the electrolytic solution. From this locally raised portion (Taylor cone) in the liquid surface, a minute droplet can be attached to the needle 22. Here, the needle 22 may be conductive, while the control voltage E1 causes an ion current having a polarity opposite to the sample ions to flow.

Figure 7:
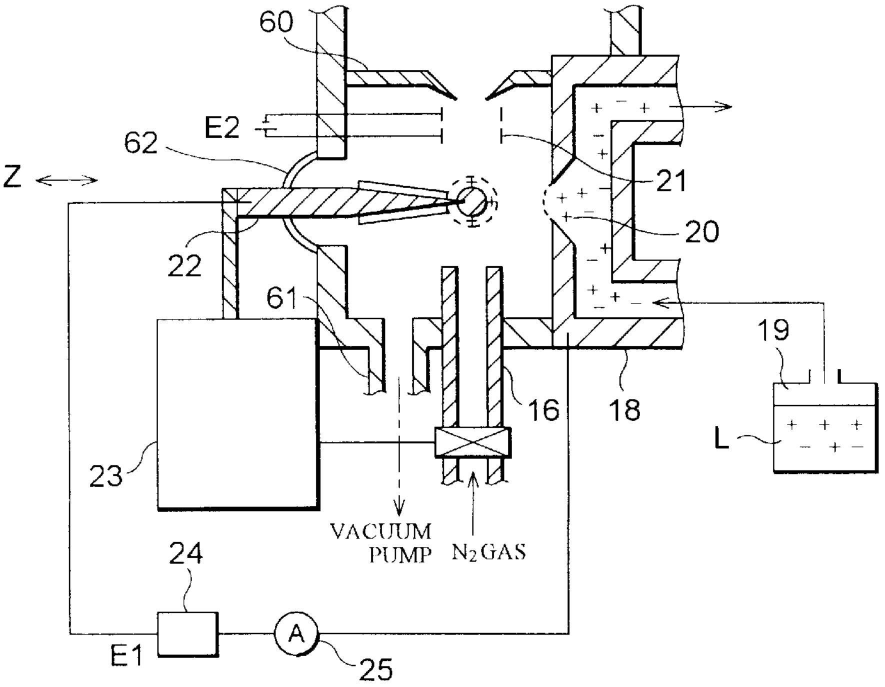

The $N_2$ gas may be jetted against the tip of the needle 22 either continuously as in the case of the above-mentioned embodiment or intermittently. The method of intermittently jetting the $N_2$ gas against the tip of the needle 22 will be explained with reference to FIG. 7. This drawing is a partial cross-sectional view corresponding to FIG. 6. In FIG. 7, the supply port 16 in FIG. 6 is provided with a valve 70 so as to control the supply of $N_2$ gas, while the valve 70 is connected to the moving device 23 such that the movement of the needle 22 and the opening and closing operations of the valve 70 can be effected in synchronization with each other. For example, an electromagnetic valve, a valve using a piezoelectric element, or the like is preferably used as the valve 70. In this configuration, ions can be emitted only at a predetermined time. Accordingly, as the TOF mass spectrometer is operated in synchronization with the emission of ions, the emitted ions can be introduced into the mass spectrometer with a high efficiency. The $N_2$ gas may be jetted out either only once or intermittently. The intervals between the jetting actions may be either constant or variable.

Though the case where the cations in the sample to be measured are collected and emitted is explained in the operation of this embodiment; when anions are to be measured, the polarities of the control voltages E1 and E2 and polarities of the pulse control voltages V1 and V2 in FIG. 1 are set opposite to those mentioned above. Namely, while the control voltage E1 is set such that the potential of the needle 22 is higher than the supply tube 18 in the processing step shown in FIGS. 4 and 5; in the ion emission step shown in FIG. 6, the control voltage E1 for making the potential of the needle 22 lower than that of the supply tube 18 or E1=0 V is set, the control voltage E2 is set such that the side of the grids 27 and 28 has a potential higher than that on the side of the supply tube 18, and the pulse control voltages V1 and V2 are set negative (V1<V2<0).

Also, while the predetermined control voltage E1 is applied in FIGS. 4 and 5 so as to attach cations or anions to the tip of the needle 22, the control voltage E1 for emitting thus attached ions may be either a positive control voltage, negative control voltage, or E1=0 V. Further, the control voltage E1 may be set to 0 V such that the electrolytic solution is attached to the needle 22, and then the control voltage E1 with a predetermined polarity may be applied as shown in FIG. 6 such that cations or anions are emitted therefrom. Namely, in the ion emission step shown in FIG. 6, cations can be emitted from the needle 22 when the positive control voltage E1 is applied thereto, whereas anions can be emitted from the needle 22 when the negative control voltage E1 is applied thereto.

Figure 8A:
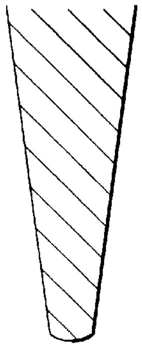
FIGS. 8A to 8G are partial cross-sectional views showing forms of a needle used in the first embodiment.
Figure 8B:
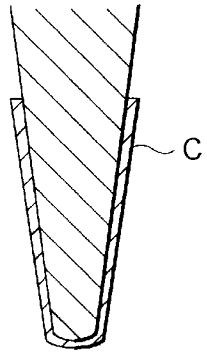
Figure 8C:
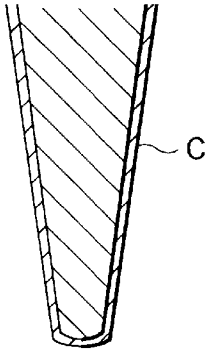
Figure 8D:
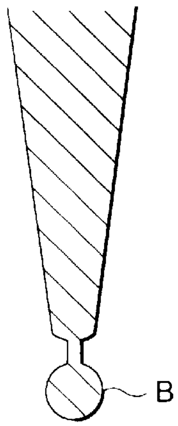
Figure 8E:
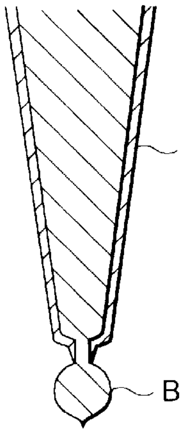
Figure 8F:
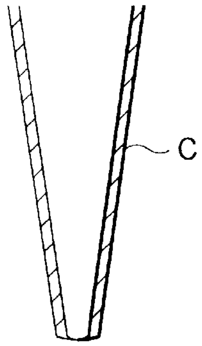
Figure 8G:
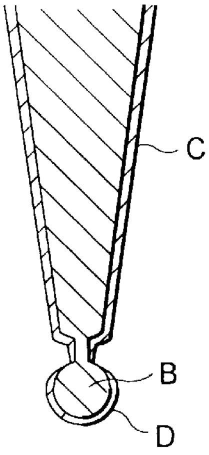

FIGS. 8A to 8G show specific examples of the needle 22 used in this embodiment. FIG. 8*a* shows a metal needle having a tip portion shaped as a relatively simple truncated cone. As shown in FIG. 8B, the tip portion of the needle may be coated with a film C made of a dielectric material. As shown in FIG. 8C, the whole needle may be coated with the dielectric film C. As shown in FIG. 8D, a constricted portion may be formed between the tip portion and base portion of the needle, and the tip portion of the needle may be provided with a spherical portion B having a diameter somewhat greater than the diameter of the constricted portion. In this configuration, since the surface tension of a droplet depends on its curvature, the droplet can be attached to the tip portion of the needle alone. As shown in FIG. 8E, the base portion of the needle may be coated with a hydrophobic material which is repellent to the electrolytic solution. In this configuration, the droplet attaches to only the tip portion. As shown in FIG. 8F, a needle constituted by a thin hollow tube may be used as well. As shown in FIG. 8G, the needle may be configured such that a constricted portion is formed in the tip portion, the tip thereof is provided with a spherical portion B having a diameter somewhat greater than the diameter of the constricted portion, the surface of the spherical portion is coated with a film D made of a dielectric material or a hydrophilic material adapted to absorb the electrolytic solution, and the other part of the tip portion of the needle is coated with a hydrophobic material such as Teflon which is repellent to the electrolytic solution. An insulating material may be used in place of or together with the dielectric material. Teflon exemplifies the material repellent to the electrolytic solution which can be utilized in such a needle.

The form of the tip portion of the needle and the coating film may be any combination of the foregoing examples or other configurations as long as the cations or anions in the electrolytic solution L can easily be attached to and emitted from the tip portion of the needle. Also, without being restricted to a circular cross-section, the needle may have an elliptical cross-section or a polygonal cross-section of triangle, rectangle, or the like.

In order to attract the cations against their mutual Coulomb force to the tip of the needle 22 as shown in FIG. 5, it is preferable for the tip of the needle 22 to have a diameter of about 10 nm with respect to about 100 pieces of cations. Though the control voltage E1 having an opposite polarity should preferably be as high as possible in order to emit these ions as shown in FIG. 6, electric discharge tends to occur as the voltage E1 is higher. Accordingly, the control voltage E1 is preferably set to several volts to several ten volts. In general, as the tip of the needle 22 is more acute, the electric field becomes locally stronger, allowing the cations to attach to the tip portion of the needle with a higher concentration. In view of the fact that the apparatus of this embodiment is applied to a typical mass spectrometer, however, the tip of the needle 22 is preferably designed so as to have a diameter of about 5 nm to 0.5 nm.

Figure 9:
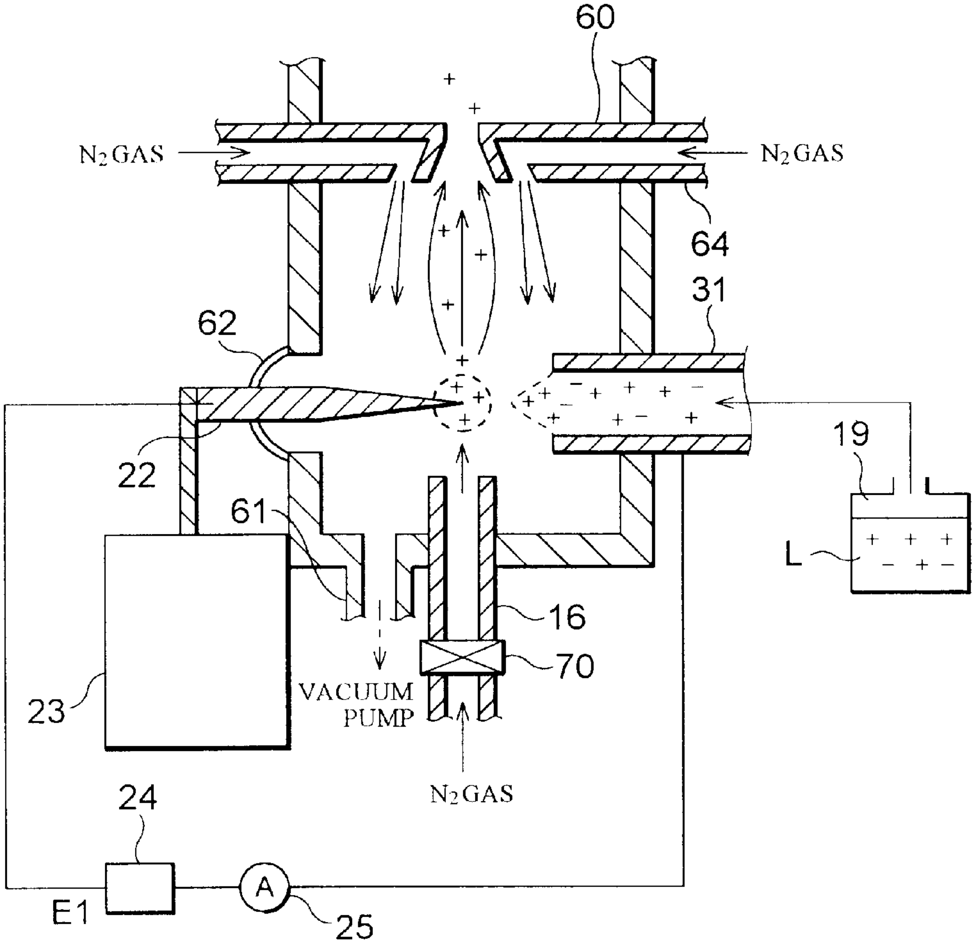
FIG. 9 is an explanatory view for further explaining operations in the first embodiment.

FIG. 9 shows a modified example of the first embodiment. In FIG. 9, an additional supply port 64 is provided so that the $N_2$ gas is jetted out from around the opening at the center portion of the skimmer 60 toward the supply port 16. When the $N_2$ gas is emitted from around the opening portion of the skimmer 60, it acts so as to converge the $N_2$ gas jetted out from the supply port 16 into the opening portion of the skimmer 60, whereby the emitted ions can efficiently be transferred to the gap between the grids 27 and 28. In FIG. 9, a capillary 31 is used for supplying the electrolytic solution L. The diameter of the capillary 31 is preferably 1 μm to several ten micrometers. Alternatively, a supply tube may be used in place of the capillary 31.

Second Embodiment

Figure 10:
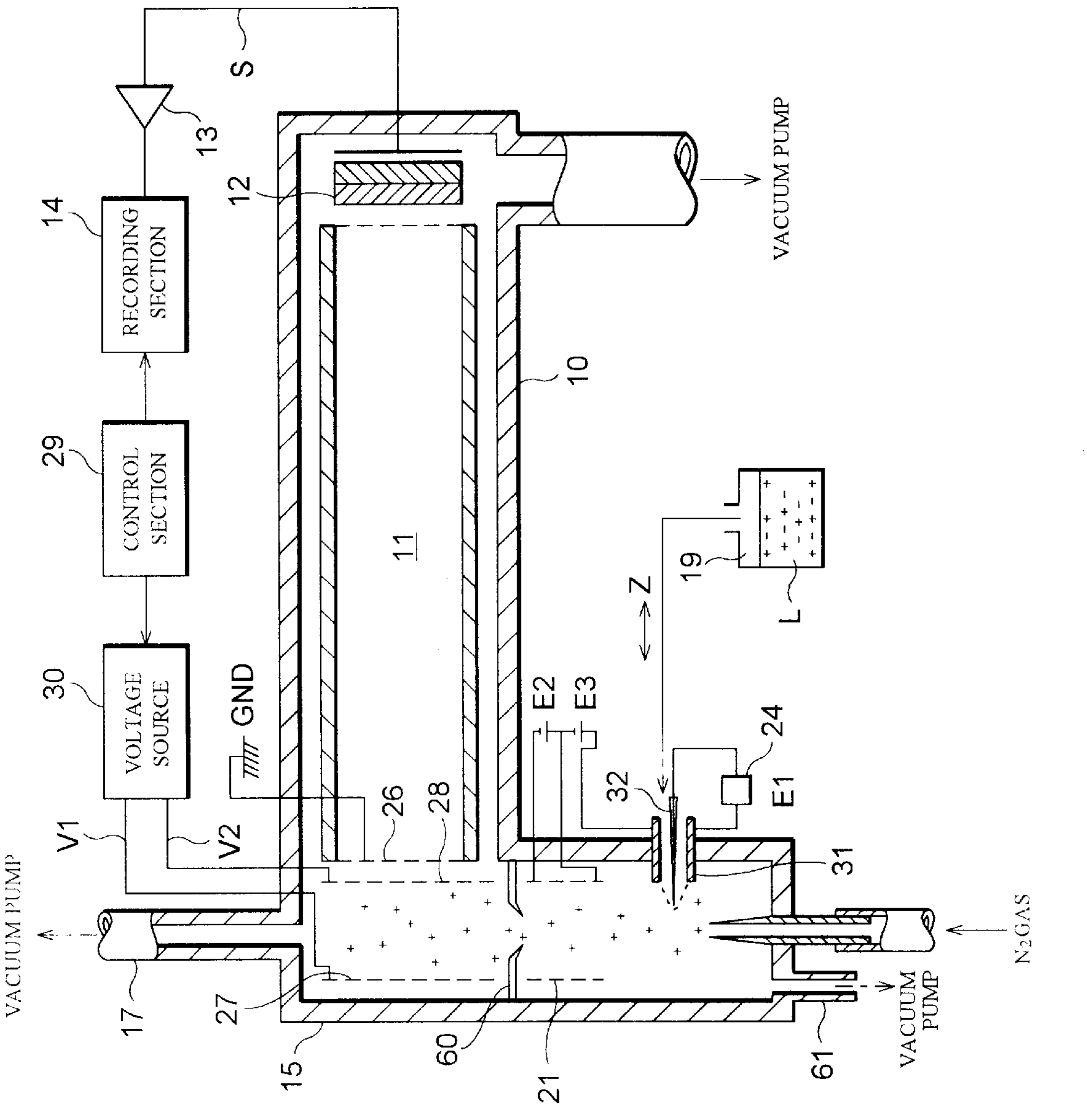
FIG. 10 is a vertical cross-sectional view showing the configuration in accordance with a second embodiment of the present invention.

In the following, a second embodiment of the present invention will be explained with reference to FIG. 10. In FIG. 10, parts identical or corresponding to those in FIG. 1 will be referred to with the marks denoting the same in FIG. 1. The differences thereof from the first embodiment shown in FIG. 1 will be explained. A side face of the ionization chamber 15 is provided with the capillary 31 for introducing the electrolytic solution L into the ionization chamber 15. Inserted into the capillary 31 is a thin needle 32 which is movable so as to advance and retract in z directions. The tip of the needle 32 projects into the ionization chamber 15 as the needle 32 advances through the capillary 31, whereas the tip of the needle 32 is received into the capillary 31 as the needle 32 retracts through the capillary 31.

Further, the voltage source 24 is connected between the capillary 31 and the needle 32 so as to apply thereto the control voltage E1 with a predetermined polarity, whereas a voltage E3 having a predetermined polarity is applied between the capillary 31 and the grid 21.

In the following, with reference to FIGS. 10 to 13 showing cross-sections of main parts of the ionizing analysis apparatus, the operation in the second embodiment will be explained as exemplified by the case where cations are analyzed. In this case, as shown in FIG. 10, the voltage E2 is applied so as to respectively set the lower end (on the side of the needle 32) and upper end of the grid 21 to higher and lower potentials, thereby forming a predetermined electric field gradient. Further, the voltage E3 is set such that the capillary 31 has a potential higher than that of the grid 21.

Figure 11:
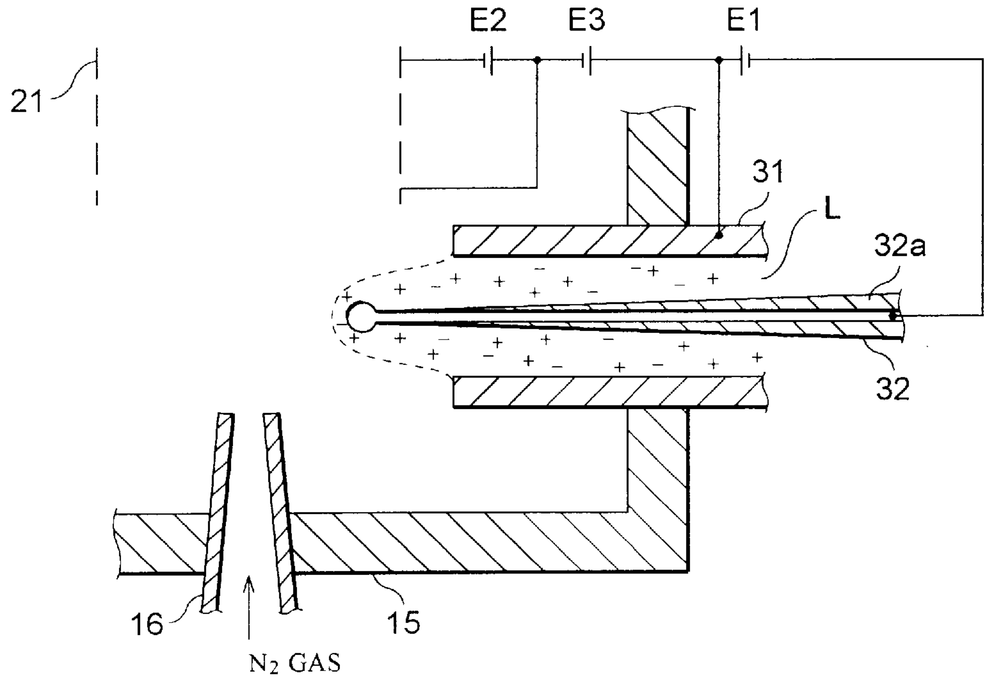
FIGS. 11 to 13 are explanatory views for explaining operations in the second embodiment.

Then, as shown in FIG. 11, the electrolytic solution L is supplied to the capillary 31, and the needle 32 is moved into the ionization chamber 15 to such an extent that the tip of the needle 31 is covered with the electrolytic solution L due to the surface tension of the latter. Concurrently, the control voltage E1 for causing the needle 32 to have a potential lower than that of the capillary 31 is applied. As a result, due to the electric field generated between the capillary 31 and the needle 32, the cations in the electrolytic solution L migrate to the tip of the needle 32 or its vicinity due to electrophoresis.

Figure 12:
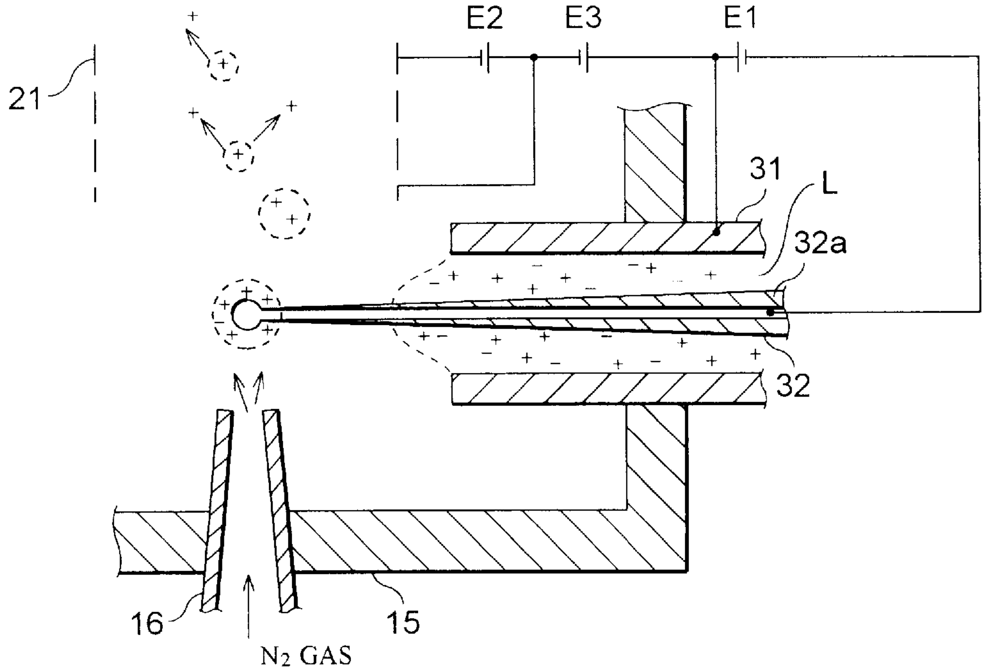

Then, as shown in FIG. 12, the tip portion of the needle 32 is advanced into the ionization chamber to the position where $N_2$ gas is jetted out. The tip of the needle 32 is distance from the liquid surface of the electrolytic solution L with a droplet thereof. When the $N_2$ gas is jetted out against the tip portion of the needle 32 while the polarity of the control voltage E1 is reversed so as to set the needle 32 to a potential higher than that of the capillary 31, the droplet containing cations attached to the needle 32 is emitted into the ionization chamber 15. When the solvent evaporates from thus emitted droplet, the droplet reduces its surface area, whereby the cations are emitted into the ionization chamber 15 due to ion evaporation or the like. Due to the electric field gradient of the grid 21, these cations migrate to the gap between the grids 27 and 28. Thereafter, the voltage source 30 applies the positive pulse control voltages V1 and V2 to the grids 27 and 28, respectively, whereby the cations are emitted into the drift region 11 and caused to fly. Based on the signal S, which is obtained as the MCP 12 detects the cations, the recording section 14 records a mass spectrum.

Thus, in the second embodiment, first, the electrolytic solution L containing an ionized sample is attached to the tip portion of the needle 32. At the time when thus attached ions are emitted into the ionization chamber 15, the predetermined control voltage E1 is initially applied to the needle 32 such that the cations are attached thereto as being concentrated, the control voltage E1 with a reversed polarity is applied to the needle 32, and the $N_2$ gas is jetted out so as to emit the droplet containing the cations. Accordingly, its operations are quite simple. The control voltage E1 for emitting the droplet containing cations may be as low as several volts to several ten volts. Also, overcome is the conventional problem that a large amount of unnecessary electrolytic solution is ionized so as to obstruct the measurement. Further, when the control voltage E1 is applied to the inner metal portion of the needle 32 while a part of or the whole needle 32 is coated with a dielectric film 32*a* as shown in FIGS. 8B to 8G, the electric field can efficiently be applied to the tip portion of the needle 32. Moreover, when the film 32*a* is made of such a material as Teflon, the electrolytic solution attached to the tip portion of the needle 32 and the electrolytic solution L in the capillary 31 can easily be separated from each other, whereby the process can rapidly shift to the ion emitting step. Accordingly, the whole processing time for emitting ions can be shortened.

Though the second embodiment exemplifies the case where cations are processed; when anions are to be processed, the polarities of the above-mentioned control voltages E1 to E3 and the polarities of the pulse control voltages V1 and V2 are set opposite to those in the case where the cations are processed.

Figure 13:
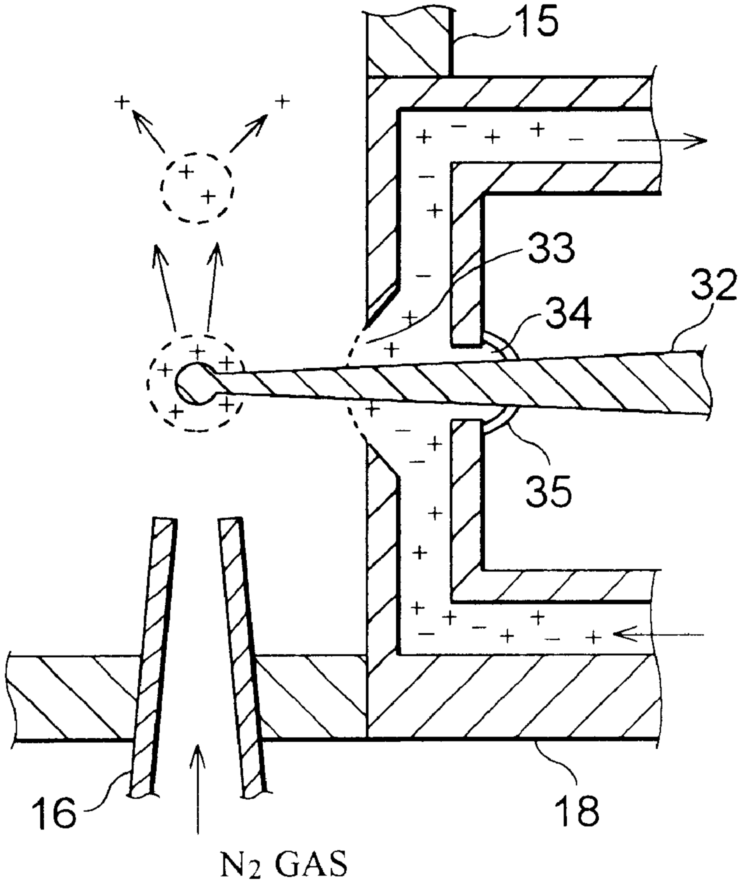

Also, as a modified example of the second embodiment, the configuration of the supply tube for feeding the electrolytic solution and the disposition of the needle may be set as shown in FIG. 13. This drawing is a partial cross-sectional view corresponding to FIG. 12. In FIG. 13, in place of the capillary 31 shown in FIG. 10, the supply tube 18 is disposed on a side face of the ionization chamber 15, and minute holes 33 and 34 transversely penetrates the supply tube 18, the hole 33 faces inside of the ionization chamber 15. The needle 32 is inserted through the holes 33 and 34, whereas the gap between the hole 34 and the needle 32 is closed with a flexible sealant 35. As in the case shown in FIGS. 10 to 12, when the tip of the needle 32 is brought into contact with the electrolytic solution L while the control voltage E1 is applied thereto, and then the needle 32 is inserted into the ionization chamber 15, a droplet containing ions with a predetermined polarity can be attached to the tip of the needle 32. Then, when the $N_2$ gas is jetted against the tip of the needle 32 while the control voltage E1 is set to a predetermined polarity, the droplet containing ions attached thereto is emitted. When the solvent evaporates from thus emitted droplet, the droplet reduces its surface area, whereby the cations are emitted into the ionization chamber 15 due to ion evaporation or the like. Accordingly, the present invention can be realized either with a capillary or supply tube.

Third Embodiment

Figure 14:
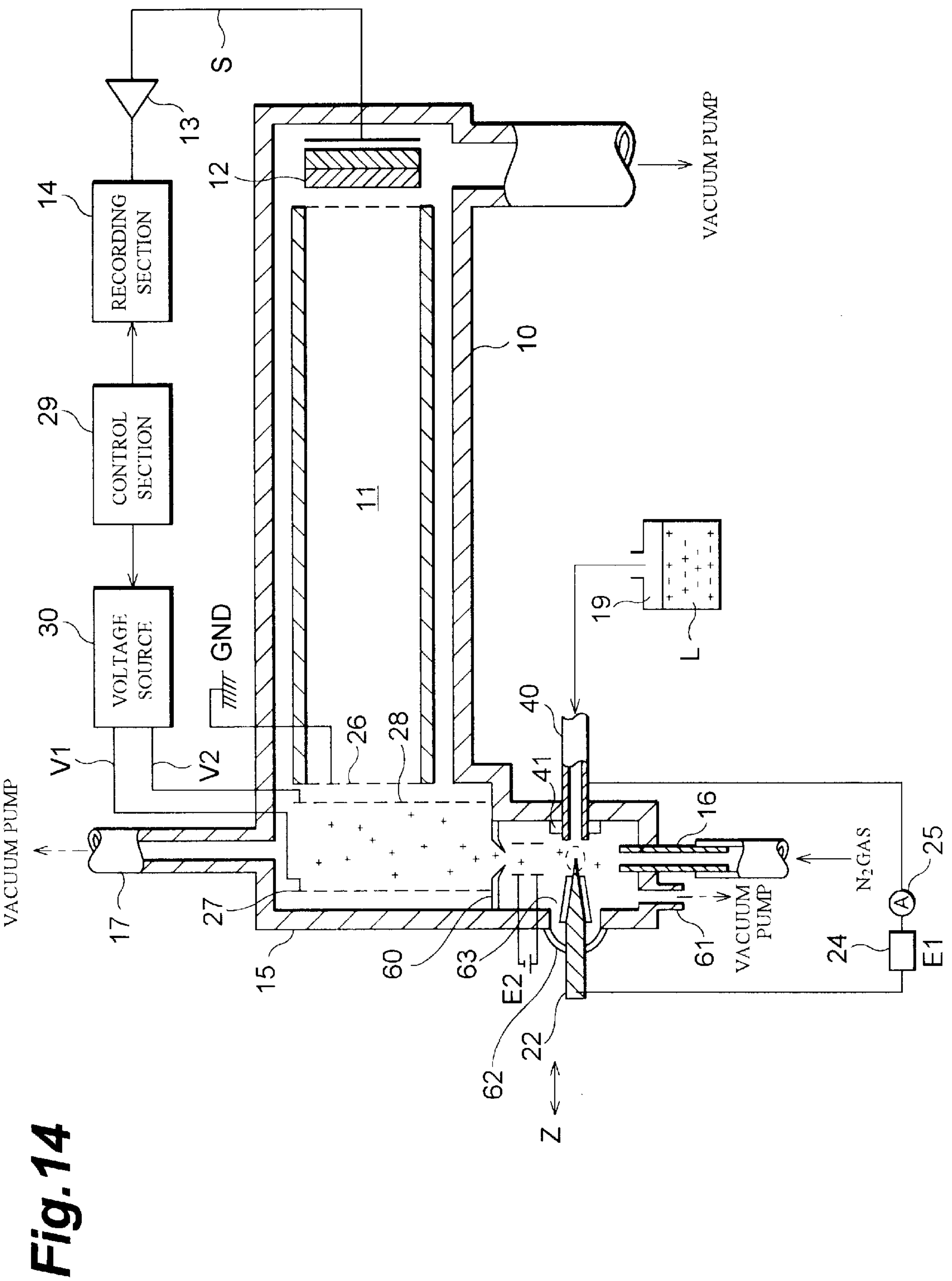
FIG. 14 is a vertical cross-sectional view showing the configuration in accordance with a third embodiment of the present invention.

In the following, a third embodiment of the present invention will be explained with reference to FIG. 14. In FIG. 14, parts identical or corresponding to those in FIG. 1 will be referred to with the marks denoting the same in FIG. 1. The differences thereof from the first embodiment shown in FIG. 1 will be explained. A lower side face of the ionization chamber 15 is provided with a capillary 40 for introducing the electrolytic solution L into the ionization chamber 15, whereas the hole 63 is bored in the ionization chamber 15 at a position opposing to the capillary 40, securing the needle 22 inserted therethrough. The gap between the needle 22 and the hole 63 is closed with a sealant 62. The tip portion of the needle 22 and the tip of the capillary 40 are separated from each other by a gap of about several micrometers. Attached to the tip portion of the capillary 40 is a ultrasonic vibrator 41. In response to an AC current from an AC power source (not depicted), the ultrasonic vibrator 41 vibrates the electrolytic solution L by vibrating the capillary 40. Connected between the capillary 40 and the needle 22 is the voltage source 24 for applying the control voltage E1 with a predetermined polarity.

Figure 15:
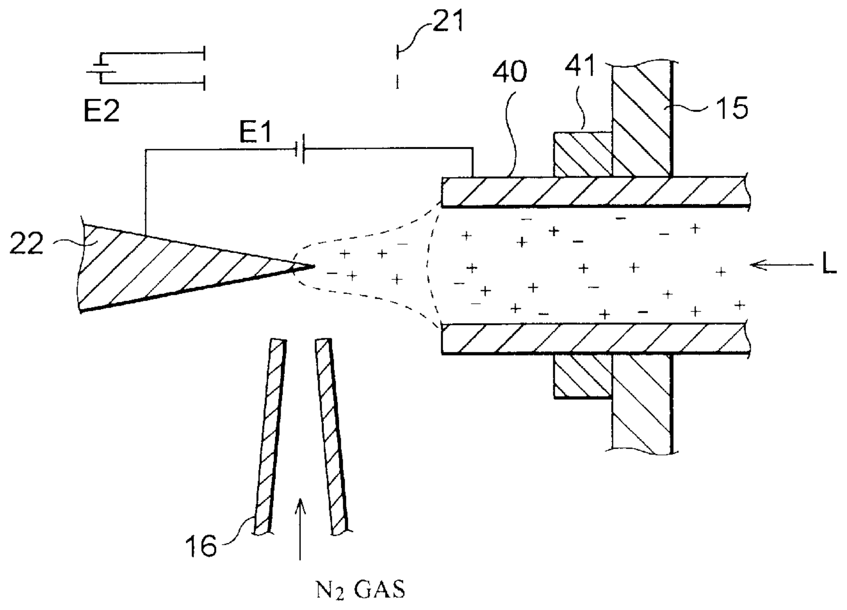
FIGS. 15 to 17 are explanatory views for explaining operations in the third embodiment.
Figure 16:
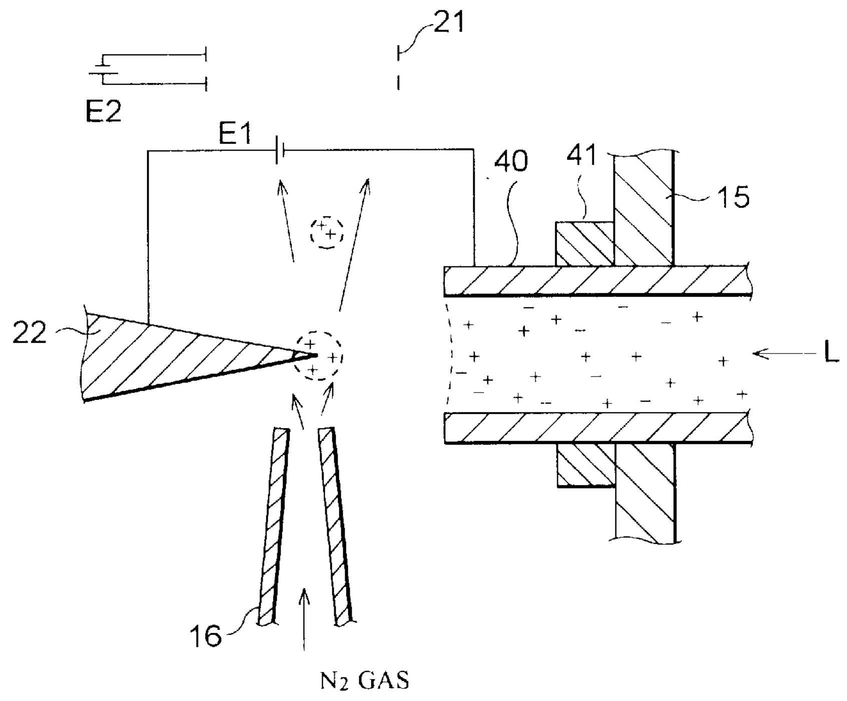

In the following, with reference to FIGS. 15 and 16 showing cross-sections of main parts of the ionizing analysis apparatus, the operation in the third embodiment will be explained as exemplified by the case where cations are analyzed. As shown in FIGS. 15 and 16, the voltage E2 is applied so as to respectively set the lower end (on the side of the capillary 40) and upper end of the grid 21 to higher and lower potentials, thereby forming a predetermined electric field gradient within the grid 21.

First, as shown in FIG. 15, the electrolytic solution L is supplied to the capillary 40. Then, the vibrator 41 is vibrated simultaneously with application of the control voltage E1 for setting the capillary 40 and the needle 22 to higher and lower potentials, respectively. As the capillary 40 vibrates, the electrolytic solution L in the capillary 40 vibrates, whereby a locally raised portion (Taylor cone) is developed in the liquid surface of the electrolytic solution L, so that the droplet attaches to the needle 22. Also, under the influence of the electric field formed by the control voltage E1, the cations in the electrolytic solution L converge on the tip of the needle 22 or its vicinity due to electrophoresis. Accordingly, without the needle 22 being moved, concentrated cations can be attached to the tip thereof.

As shown in FIG. 16, in a state where the distance between the liquid surface of the electrolytic solution L and the needle 22 is increased as the vibration frequency of the ultrasonic vibrator 41 is changed, the $N_2$ gas is jetted out against the tip of the needle 22. Also, the polarity of the control voltage E1 is reversed so that the potential of the needle 22 is higher than that of the capillary 40. Consequently, the droplet containing cations is emitted from the tip of the needle 22. Due to the electric field gradient of the grid 21, thus emitted cations migrate to the gap between the grids 27 and 28 (see FIG. 14). Thereafter, as shown in FIG. 14, the voltage source 30 applies the positive pulse control voltages V1 and V2 to the grids 27 and 28, respectively, whereby the cations are emitted into the drift region 11 and caused to fly. Based on the signal S, which is obtained as the MCP 12 detects the cations, the recording section 14 records a mass spectrum.

Thus, in the third embodiment, since electrolytic solution L is vibrated with the ultrasonic vibrator 41 and is attracted by the electric field, so that the droplet containing cations is attached to the tip portion of the needle 22, there is no need to move the needle 22. Accordingly, the positional adjustment for the needle is unnecessary, whereby simplification of the apparatus, improvement in mechanical precision, and the like can be attained. Also, since ions can repeatedly be attached to the tip of the needle 22 without mechanical movement of the needle 22, the time required for analysis can be shortened. Further, the electrolytic solution L is prevented from unnecessarily being ionized to obstruct measurement as in the case of the prior art.

Also, when the ultrasonic vibrator 41 is used and repeatedly operated at a suitable frequency, a locally raised portion (Taylor cone) can be developed quite stably in the liquid surface of the electrolytic solution L within the capillary 40, whereby the droplet containing the ions can stably be attached to the tip of the needle 22. Such a frequency is preferably 100 Hz to 10 kHz.

Though this embodiment exemplifies the case where cations are processed; when anions are to be processed, the polarities of the above-mentioned control voltages E1 and E2 and the polarities of the pulse control voltages V1 and V2 are set opposite to those in the case where the cations are processed.

Figure 17:
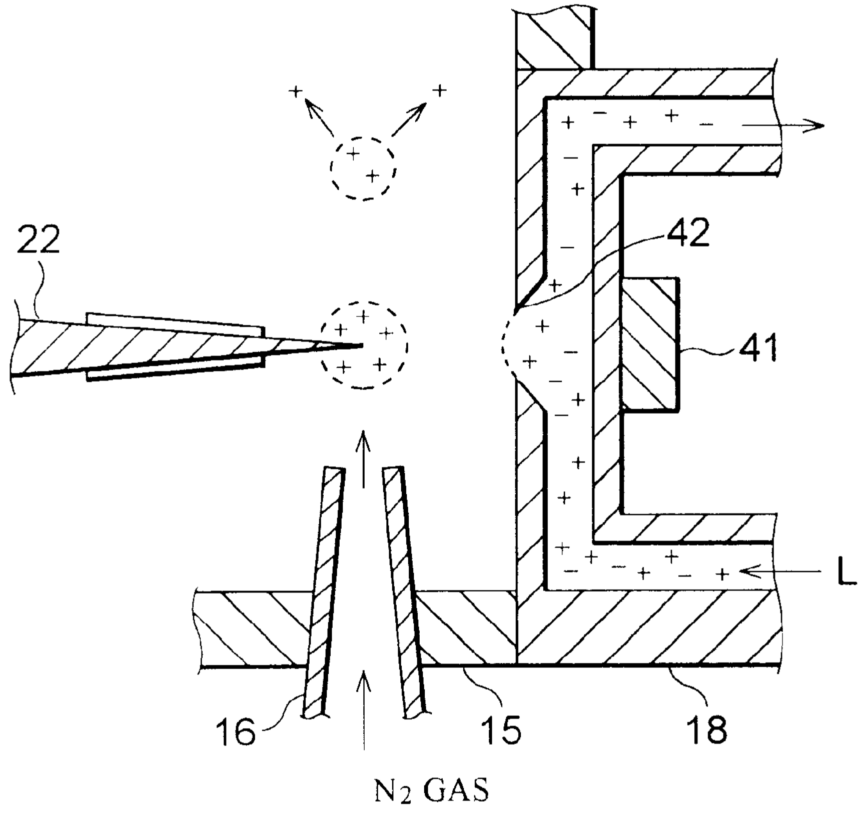

As a modified example of the third embodiment, the structure for attaching the electrolytic solution L to the needle 22 may be configured as shown in FIG. 17. This drawing is a partial cross-sectional view corresponding to FIGS. 15 and 16. In FIG. 17, in place of the capillary 40 in FIG. 14, the supply tube 18 is disposed on the lower side face of the ionization chamber 15. One end of the supply tube 18 is bored with a hole 42 communicating with the ionization chamber 15. Also, the ultrasonic vibrator 41 is secured to the supply tube 18 on a side face opposing to the hole 42. As in the case shown in FIGS. 15 and 16, when the supply tube 18 is filled with the electrolytic solution L, the control voltage E1 is applied thereto, and the vibrator 41 is vibrated, a locally raised portion (Taylor cone) can be generated in the liquid surface of the electrolytic solution L in the hole 42. Accordingly, in response to the polarity of the control voltage E1, a droplet containing concentrated cations can be attached to the tip of the needle 22. As the $N_2$ gas is jetted out from the supply port 16 against the tip of the needle 22, the droplet is emitted from the needle 22. Further, the ions emitted from the droplet are subjected to mass spectrometry or the like.

Fourth Embodiment

Figure 18:
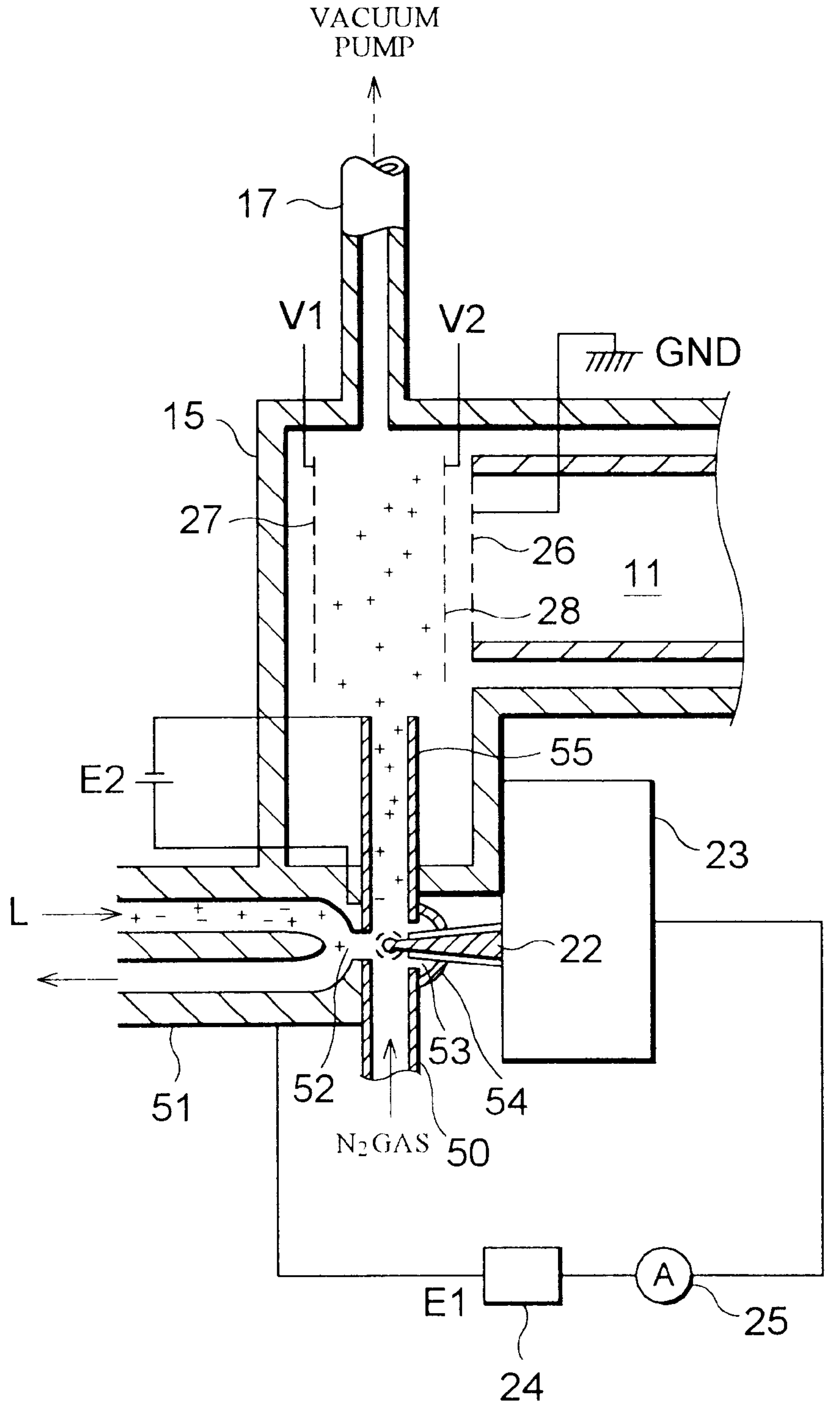
FIG. 18 is a vertical cross-sectional view showing the configuration in accordance with a fourth embodiment of the present invention.

In the following, a fourth embodiment of the present invention will be explained with reference to FIG. 18. In FIG. 18, parts identical or corresponding to those in FIG. 1 will be referred to with the marks denoting the same in FIG. 1. In FIG. 18, connected to the lower end of the ionization chamber 15 is a capillary 50 for supplying the $N_2$ gas into the ionization chamber 15, whereas a capillary 51 is disposed so as to supply the electrolytic solution L to the capillary 50 from a direction substantially orthogonal thereto. Bored in the wall between the capillaries 50 and 51 by means of laser processing or the like is a hole 52 having a diameter of about 1 μm to 10 μm, whereby the capillary 51 communicates with the inside of the ionization chamber 15 through the hole 52. By means of laser processing or the like, a side wall of the capillary 50 opposing to the hole 52 is bored with a hole 53 having a diameter of about 10 μm to 50 μm. The needle 22 is inserted into the hole 53, whereas the gap between the hole 53 and the needle 22 is closed with a flexible sealant 54. The needle 22 is connected to a piezoelectric element, ultrasonic vibrator element, or the like accommodated in the moving device 23. As such an element drives the needle 22, the tip of the needle 22 can be inserted into and retracted from the hole 52. Connected between the needle 22 and the capillary 51 is the voltage source 24 for applying the control voltage E1 with a predetermined polarity. Further, of the capillary 50, the outer circumferential face of the portion projecting into the ionization chamber 15 is coated with a film 55 made of a conductive material having a high resistance. The voltage E2 with a predetermined polarity is applied between the upper end (on the side of the grids 27 and 28) and lower end of the film 55. The configuration of the grids 27 and 28 and constituents subsequent thereto are similar to those in FIG. 1.

In the following, the operation in this embodiment will be explained as exemplified by the case where cations are analyzed. First, when the electrolytic solution L is supplied from the capillary 51, and the tip of the needle 22 is inserted into the hole 52, the tip of the needle 22 comes into contact with the electrolytic solution L. Here, when the polarity of the control voltage E1 is set such that the potential of the capillary 51 is higher than that of the needle 22, a concentrated droplet containing the cations is attached to the tip of the needle 22.

Then, the needle 22 is retracted from the hole 52 such that the tip of the needle 22 is separated from the liquid surface of the electrolytic solution L. When the $N_2$ gas is jetted against the droplet containing ions attached to the tip of the needle 22, the droplet containing the cations is emitted. Further, from this droplet, the ions are emitted into the capillary 50. Due to the electric field gradient generated by the voltage E2 and conductive film 55, thus emitted ions migrate to the gap between the grids 27 and 28. As the pulse control voltages V1 and V2 are respectively applied to the grids 27 and 28, these ions are introduced into the drift region 11 so as to be subjected to mass spectrometry.

Fifth Embodiment

In the following, a fifth embodiment of the present invention will be explained with reference to FIG. 19. This drawing is a vertical cross-sectional view showing the configuration of this embodiment. A side wall of the ionization chamber 15 is bored with a hole 63 through which a sampling needle 81 penetrates, whereas a sealant 82 is attached to the gap between the wall of the ionization chamber 15 and the needle 81. The sampling needle 81 is mechanically connected to the moving device 23 secured onto a working table (not depicted) so as to be horizontally moved by the moving device 23. The bottom face of the ionization chamber 15 is provided with the nozzle 16 projecting upward and the lower end port 61, which is connected to a vacuum pump (not depicted). On an extension of the sampling needle 81 in the tip direction, an auxiliary needle 84 is disposed so as to align with the sampling needle 81. The auxiliary needle 84 is disposed within a capillary 83 and is moved in its longitudinal direction by a piezoelectric actuator 85 constituted by a piezoelectric element.

Figure 20:
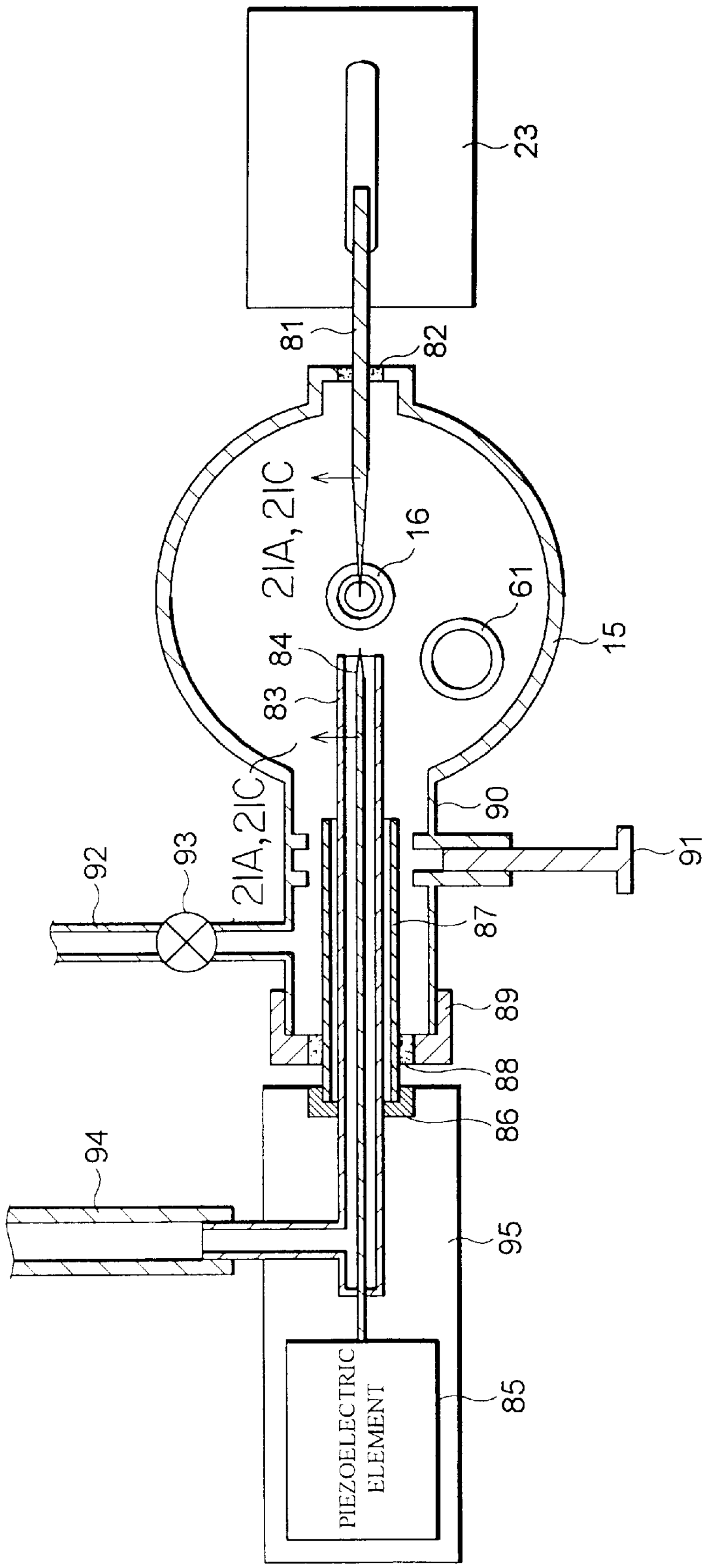
FIG. 20 is an enlarged cross-sectional view taken along line A—A of FIG. 19.

FIG. 20 is an enlarged cross-sectional view showing the configuration of a portion encompassing the sampling needle 81 and auxiliary needle 84. The capillary 83 is hermetically kept from its surroundings with a small cap 86 near one end portion thereof, whereas an auxiliary tube 87 extends from the face of the small cap 86 on the side of the ionization chamber 15 toward the ionization chamber 15. The outer surface of the auxiliary tube 87 near one end portion is attached to a large cap 89 by way of a sealant 88. The auxiliary tube 87 is adapted to slide with respect to the sealant 88 securely attached to the large cap 89. As the small cap 86 is moved in the longitudinal direction of the auxiliary needle 84, the auxiliary tube 87, capillary tube 83, and auxiliary needle 84 relatively move together with respect to the large cap 89. The side wall of the ionization chamber 15 opposed to the sampling needle 81 is provided with a preparatory chamber 90 communicating therewith for allowing the auxiliary tube 87, capillary tube 83, and auxiliary needle 84 to move therein. Disposed in the preparatory chamber 90 on the side of the ionization chamber 15 is a valve 91 for blocking a gas passage between the preparatory chamber 90 and the ionization chamber 15. Also, a side wall of the preparatory chamber 90 is provided with a valve 93 for regulating an air passage between the preparatory chamber 90 and an outlet pipe 92 for evacuating the preparatory chamber 90. These valves 91 and 93 constitute a load lock mechanism.

Figure 19:
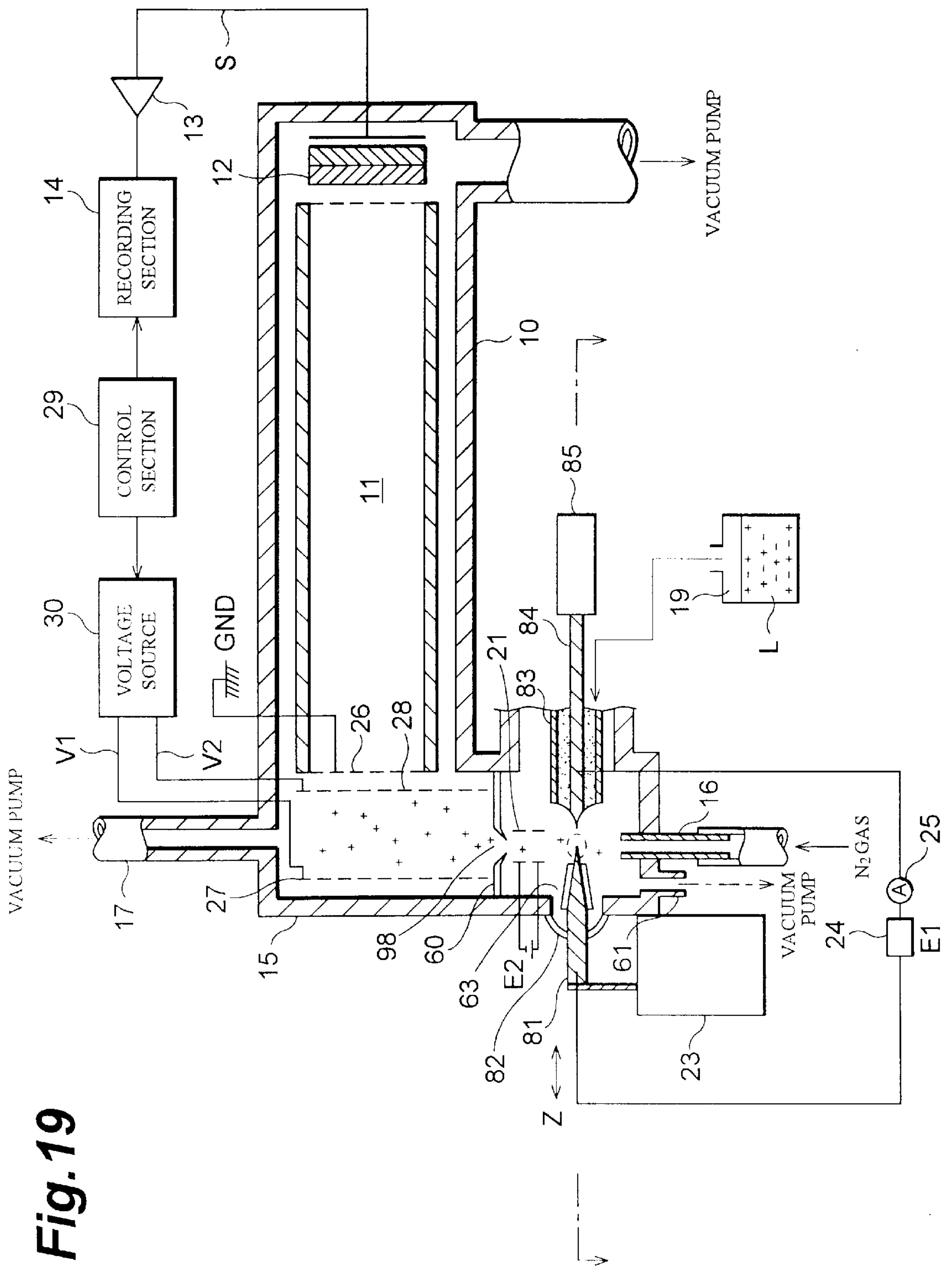
FIG. 19 is a vertical cross-sectional view showing the configuration in accordance with a fifth embodiment of the present invention.

Communicating with the capillary 83 at one end portion on the side of the piezoelectric actuator 85 is a tube 94 connected to the syringe pump 19 shown in FIG. 19. The sample material is introduced into the capillary 83 by way of this tube 94. Here, the piezoelectric actuator 85 and the small cap 86 are secured onto a substrate 95, whereby the auxiliary needle 84 can be moved with respect to the small cap 86.

Figure 21A:
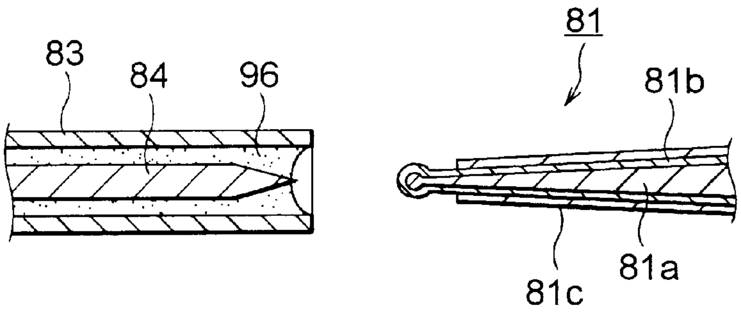
FIGS. 21A to 21C are enlarged cross-sectional views of opposed needle portions shown in FIG. 20.
Figure 21B:
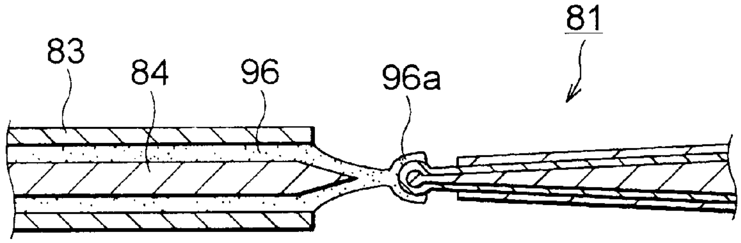
Figure 21C:
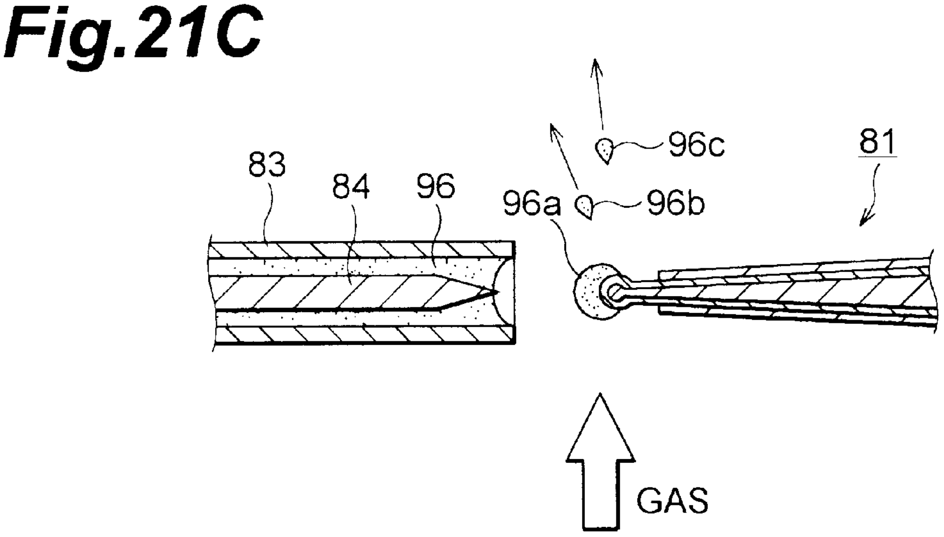

FIGS. 21A to 21C are cross-sectional views taken along line 21A–21C of FIG. 20. With reference to these drawings, the operation of the apparatus will be explained. First, as shown in FIG. 21A, the moving device 23 shown in FIG. 19 is driven so as to place the tip of the sampling needle 81 directly above the nozzle 16. Here, the sampling needle 81 is constituted by a needle body 81*a* made of a conductive material having a spherical tip, an insulating film 81*b* coated on the needle body 81*a*, and an insulating material 81*c* covering the insulation film 81*b* except for the spherical tip portion of the needle body 81*a*. The insulating material 81*c* is preferably made of Teflon. Teflon is a material which hardly absorbs solutions. Accordingly, of a droplet attached to the needle 81 under the surface tension of a sample material 96, only a very small amount is exclusively absorbed by the tip of the needle 81. Then, the solution containing the sample material is introduced into the capillary 83 by means of the syringe pump 19. Here, the sample material is assumed to be positively ionized in the solution. In this case, a negative potential is applied to the auxiliary needle 84.

Then, as shown in FIG. 21B, the actuator 85 on the side of the auxiliary needle 84 shown in FIG. 19 is driven so as to project the tip of the auxiliary needle 84 from the tip of the capillary 83. Accordingly, while being attached to the tip of the auxiliary needle 84, the surface of the tip of the solution containing the sample material is moved toward the sampling needle 81. At the time when the auxiliary needle 84 is moved, the sampling needle 81 is supplied with a potential lower than that of the auxiliary needle 84 so as to generate a Taylor cone at the tip of the solution containing the positively charged sample material. Then, from the tip of this Taylor cone, a minute droplet 96*a* containing the sample material is attached to the tip of the sampling needle 81. Here, alternatively, without the Taylor cone being generated, the solution at the tip of the auxiliary needle 84 may be attached to the tip of the sampling needle 81, so that the minute droplet 96*a* containing the sample material is attached to the tip of the sampling needle 81. In this configuration, with the aid of the auxiliary needle 84, even in the case where the diameter of the capillary 81 is not greater than 10 μm, the influence of the surface tension of the sample material 96 can be minimized, thereby allowing the liquid surface form of the tip of the capillary 81 to be controlled stably.

Thereafter, as shown in FIG. 21C, against the attached droplet 96*a* containing the sample material, a gas is jetted out from therebelow from the nozzle 16 shown in FIG. 19. At this moment, as in the case of electro-spray technique, the droplet 96*a* containing the sample material is ionized.

In the electro-spray technique, the droplet 96*a* containing the sample material comes apart and is blown up as droplets 96*b* and 96*c*. Thus blown up droplets 96*b* and 96*c* have a very small size (1 μm or less) and are repeatedly subjected to splitting thereof and evaporation of their solvent till the sample material is emitted into the atmosphere as ions. Namely, as the surface area of the droplets 96*b* and 96*c* becomes smaller, the ions of the sample or those of the solvent migrate to the surface of each droplet due to their Coulomb repulsion. When the volume of the droplet is further reduced such that the radius thereof reaches its critical level (about 10 μm), the ions are emitted (evaporated) from the droplet due to the Coulomb repulsion acting among ions in the droplet. Here, the velocity of the gas may be set close to the sonic velocity according to sonic spray ionization technique, so as to ionize the sample material. In the foregoing two kinds of techniques, the size of the droplet becomes 0.1 to 0.01 μm when the tips of the two needles mentioned above have a minute size. Accordingly, the evaporation of ions from the droplet occurs very fast, whereby the distance between the point where the minute droplet is generated and an orifice 98 can be made as short as about 0.1 to 1 mm.

As shown in FIG. 19, due to the electric field gradient in the grid 21, thus emitted cations migrate to the gap between the grids 27 and 28. Then, as the voltage source 30 applies the positive pulse control voltages V1 and V2 to the grids 27 and 28, respectively, the cations are emitted into the drift region 11. Thereafter, the cations impinge on the MCP 12, whereby the recording section 14 records their mass spectrum based on the detection signal S. Accordingly, the ions generated within the ionization chamber can efficiently be introduced into the acceleration space.

Here, the voltage applied to the sampling needle 81 or auxiliary needle 84 may be changed according to the movement of the actuators 83 and 85. Namely, when these needles come close to each other so as to attract a droplet to the sampling needle 81, the sampling needle 81 may be caused to attract the sample material ions in the droplet; whereas a voltage repulsive to the sample material ions in the droplet may be applied to the sampling needle 81 when the droplet is to be blown away with the gas. It also holds true in the case of the auxiliary needle 84.

Also, unlike those shown in FIGS. 21A to 21C, the auxiliary needle 84 may be fixed to the position shown in FIG. 21*b*, while the sampling needle 81 may be moved to take out the droplet 96*a*.

While the moving devices 83 and 85 are vibrated at a predetermined frequency for taking out the droplet, they may be vibrated with a minute amount of movement at a frequency different from the above-mentioned predetermined frequency. Consequently, the droplet attached to the tip of the sampling needle 81 can be made very small.

Figure 22:
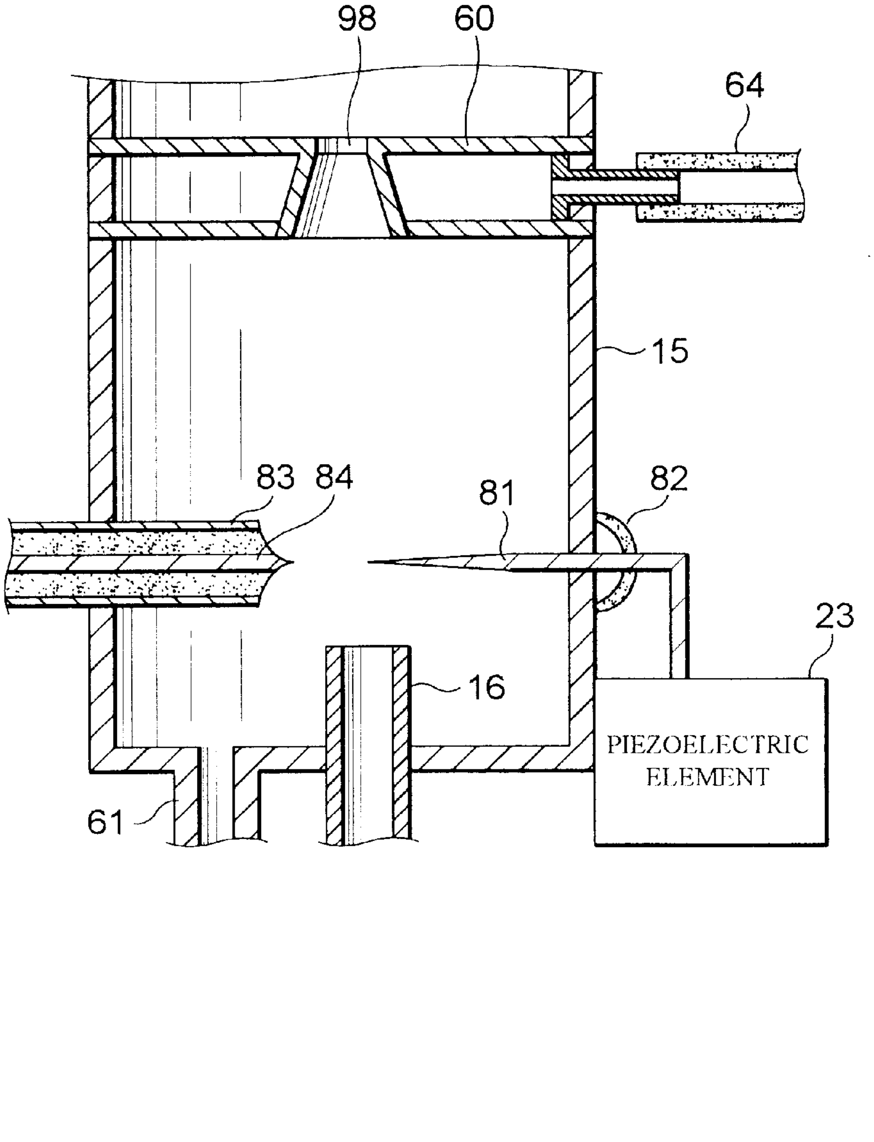
FIGS. 22 to 24 are partial cross-sectional views respectively showing modified examples of the fifth embodiment.

FIG. 22 shows a modified example of this embodiment. In the following modified examples, only their differences from the above-mentioned apparatus of this embodiment will be explained. In this example, the capillary 83 is fixed to a side wall of the ionization chamber 15, whereas the sampling needle 81 penetrates through the center portion of the flexible sealant 82 sealing a side wall of the ionization chamber 15. Further, the piezoelectric element 23 is secured to the outer face of side wall of the ionization chamber 15.

Figure 23:
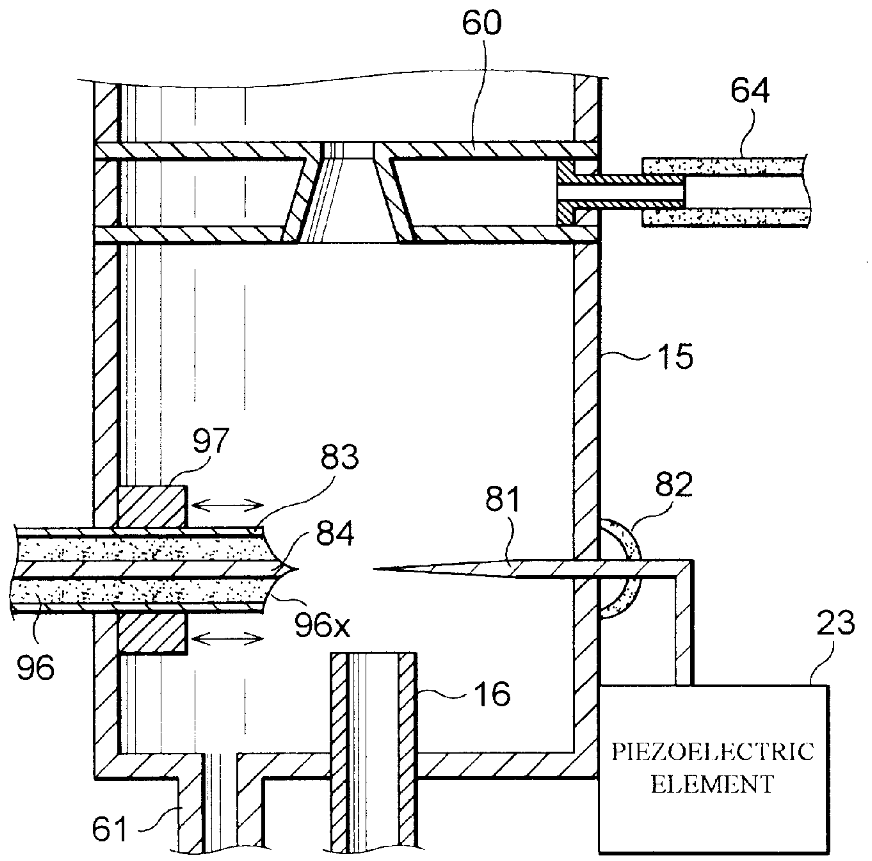

FIG. 23 is a partial cross-sectional view showing another modified example. In this example, a piezoelectric element 97 for securing the circumference of the capillary 84 to the inside of a side wall of the ionization chamber 15 is provided. In response to a control signal from a control unit (not depicted), the piezoelectric element 97 can expand and contract in the directions of arrows in the drawing, i.e., in the longitudinal directions of the auxiliary needle 84, thereby allowing the capillary 83 to move in these directions. The voltage applied to the piezoelectric element 97 may be either DC or AC voltage. In this configuration, the movement control of a liquid surface 96*x* can be effected more precisely. Accordingly, a minute amount of droplet can be attached to the sampling needle 81.

Figure 24:
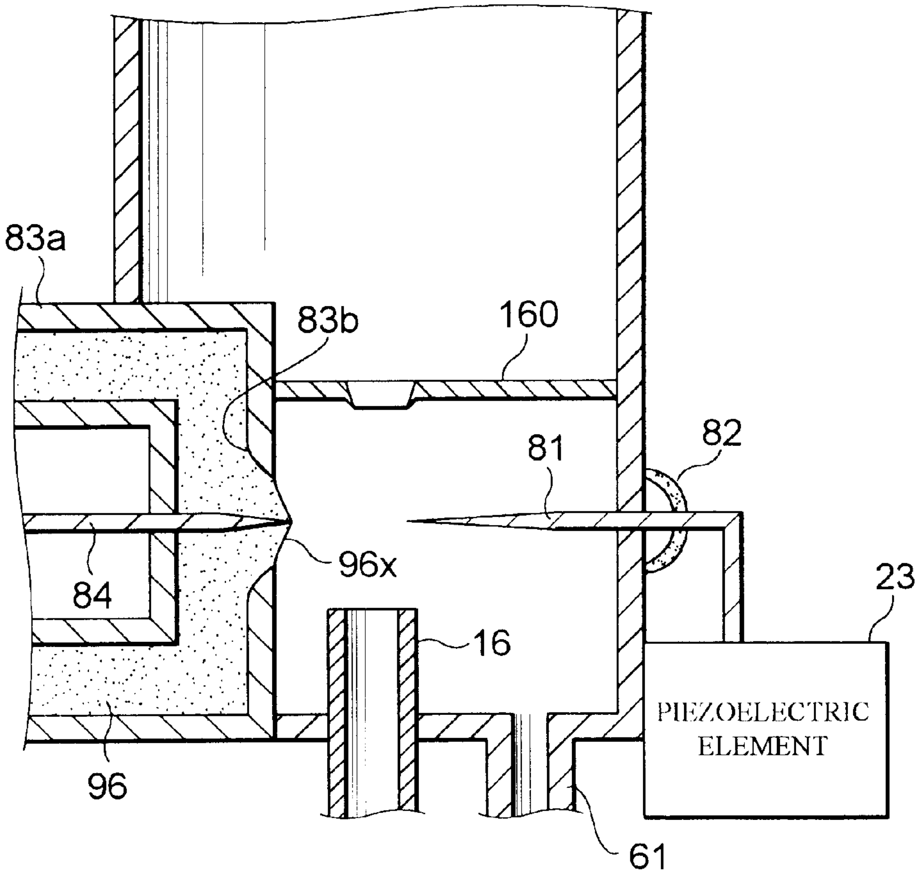

FIG. 24 is a partial cross-sectional view showing a still another modified example. In this example, a capillary tube 83*a* is used in place of the capillary 83, whereas a converging member 160 having an opening alone is provided. A side wall of the tube 83*a* is bored with a minute opening 83*b*, whereas the auxiliary needle 84 can be moved in the direction penetrating through the opening, thereby allowing the liquid surface 96*x* of the sample material 96, in a cone shape, to project into the ionization chamber. Consequently, the liquid surface 96*x* can be formed stably, allowing a minute amount of droplet to attach to the tip of the sampling needle 81. The movement control of the needles 81 and 84 is the same as that of the other embodiment. Here, for supplying the sample material, a separated capillary tube may be used in place of the syringe pump so as to effect capillary electrophoresis.

Figure 25A:
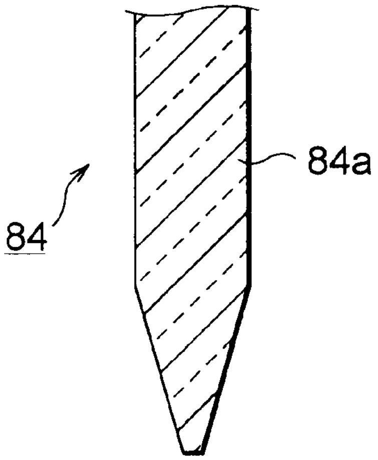
FIGS. 25A and 25B are cross-sectional views respectively showing examples of an auxiliary needle in the present invention.
Figure 25B:
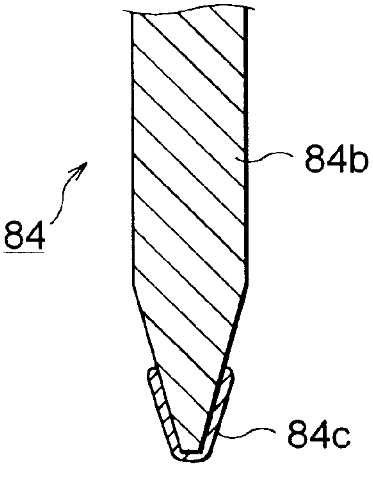
Figure 26:
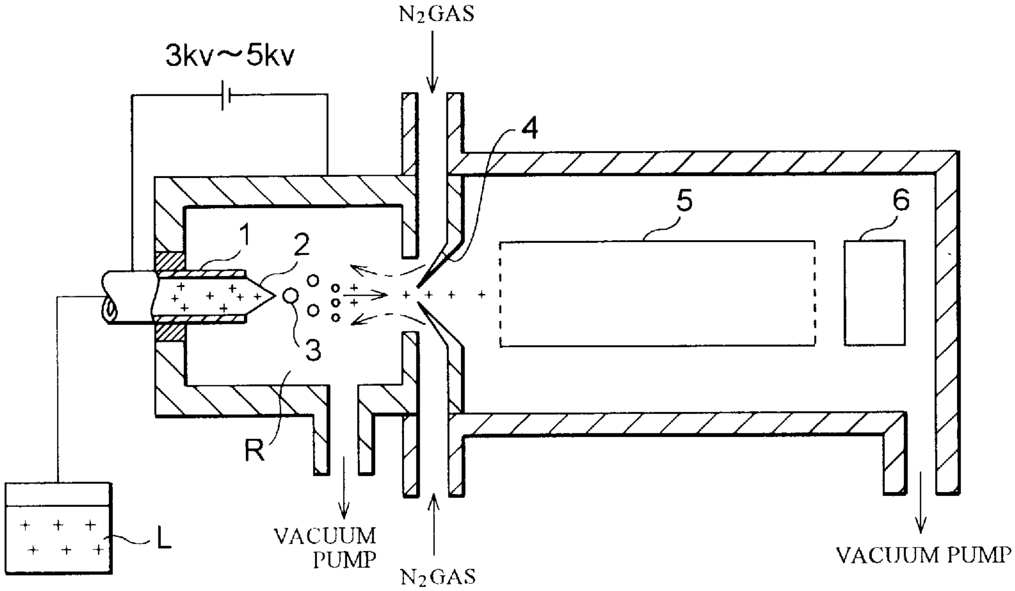
FIG. 26 is a cross-sectional view showing the configuration of the conventional ionizing analysis apparatus based on electro-spray technique.
Figure 27:
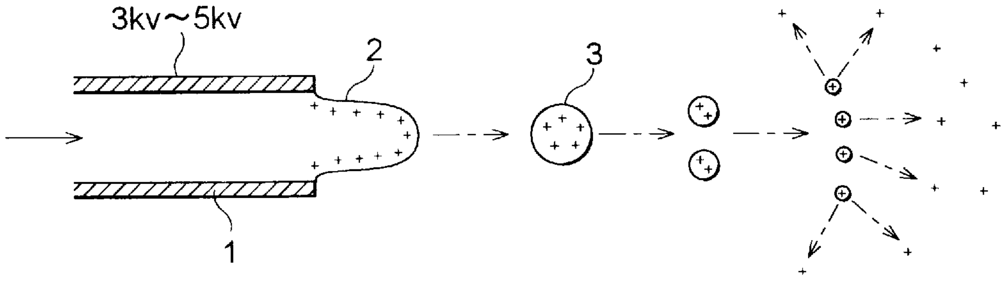
PRIOR ART Fig.27
FIG. 27 is an explanatory view for explaining problems of the conventional ionizing analysis apparatus.

As the sampling needle 81, any needle form of the first embodiment shown in FIGS. 8*a* to 8*g* may be used. Here, the form of the auxiliary needle 84 will be explained with reference to FIGS. 25A and 25B. The auxiliary needle 84 shown in FIG. 25A is constituted by an insulating material 84*a* such as glass. The auxiliary needle 84 shown in FIG. 25B comprises a coating film 84*c* disposed at the tip of a needle body 84*b* made of a conductor. The coating film 84*c* is constituted by a material which is highly absorbent of the solution. Also, the auxiliary needle 84 may be shaped like the above-mentioned sampling needle 81, i.e., that of the first embodiment shown in FIGS. 8*a* to 8*g*.

Though the foregoing embodiments exemplify the case where the present invention is applied to the TOF mass spectrometer, without being restricted thereto, the present invention is applicable to other mass spectrometers such as quadruple mass spectrometer.

As explained in the foregoing, in accordance with the present invention, the ionization chamber is provided with a needle, a droplet containing ions of the electrolytic solution L is attached to the tip of the needle, and a nonvolatile gas is jetted against the tip so as to emit the droplet or ions therefrom, whereby the ions of the sample to be measured can easily be obtained in a short time. Accordingly, an ionizing analysis apparatus which is capable of reducing the time required for ion analysis can be provided.

Also, since the ionization chamber is provided with the needle, the droplet containing ions of the electrolytic solution L is attached to the tip of the needle, and the nonvolatile gas is jetted against the tip so as to emit the droplet or ions therefrom, the ions of the sample to be measured can repeatedly be obtained in a simple manner in a short time. Accordingly, an ionizing analysis apparatus which enables a continuous operation can be provided.

Further, in accordance with the present invention, a locally raised portion (Taylor cone) is formed in the liquid surface of the electrolytic solution due to the electric field generated by the voltage applied to the needle, the electrolytic solution is vibrated with a vibrator so as to form a locally raised portion (Taylor cone) in the liquid surface thereof, or a needle is brought into contact with the electrolytic solution so as to generate a minute droplet of the electrolytic solution. Accordingly, a droplet having a diameter as small as 1 μm to several microns, which has been the lower limit in the conventional electro-spray technique, can be taken out from a capillary.

Moreover, since a minute amount of ions can be generated in this manner, almost all the ions generated can be subjected to mass spectrometry or the like. Accordingly, the transfer efficiency can be made higher as compared with the prior art, thereby enabling highly accurate ion analysis.

In accordance with another embodiment of the present invention, the takeout needle (sampling needle) 81 and the auxiliary needle 84 disposed in the capillary 83 are used so as to take out a minute droplet by the tip of the former, and then the droplet is ionized by an electric field, gas, or the like. Also, the needles 81 and 84 are moved as a piezoelectric element is vibrated. When their moving period is regulated, the amount of droplet to be ionized can be controlled from a minute level. Accordingly, the whole amount of the ionized droplet can be introduced into a TOF system, whereby ionization and mass spectrometry of biopolymers can be effected with a very high sensitivity. Also, when the tips of the sampling and auxiliary needles are made very small, the droplet can have a very small size, thereby allowing the ions to evaporate from the droplet very fast. Thus, the distance between the tip of the sampling needle 81 and the orifice 98 can be made as short as 0.1 to 1 mm, whereby the ions generated in the ionization chamber can efficiently be introduced into the acceleration space. Accordingly, the sampling accuracy of the sample material can further be made higher than that conventionally available.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 126147/1996 filed on May 21, 1996, and No. 266283/1996 filed on Oct. 7, 1996 are hereby incorporated by reference.

What is claimed is:

1. An ionizing analysis apparatus which ionizes a sample material contained in an electrolytic solution in a chamber, emits thus obtained ion, and then detects thus emitted ion, said apparatus comprising:

a supply tube which supplies the electrolytic solution into said chamber and has an opening within said chamber;

a needle having a tip disposed so as to oppose to said opening within said chamber;

a nozzle for jetting out a gas against any region between the tip of said needle and said opening from a direction substantially orthogonal to a longitudinal direction of said needle;

takeout means for taking out a droplet of said electrolytic solution by said needle; and emitting means for emitting the droplet is into said chamber by the gas jetting out from said nozzle against the droplet taken out by said takeout means or said needle having the tip to which the droplet is attached.

2. An ionizing analysis apparatus according to claim 1, wherein said emitting means further comprises means for applying a predetermined voltage to said needle, said predetermined voltage corresponding to a charge polarity of the ion in said droplet taken out.

3. An ionizing analysis apparatus according to claim 1, wherein said emitting means further comprises means for intermittently emitting the gas.

4. An ionizing analysis apparatus according to claim 1, further comprising a skimmer disposed in said chamber so as to oppose to said nozzle across said needle and opening, said skimmer having an opening portion substantially at the center thereof and a gas emitting port, said gas emitting port being disposed around said opening portion so as to be directed toward said nozzle.

5. An ionizing analysis apparatus according to claim 1, wherein said takeout means further comprises means for applying, between said needle and said opening, a predetermined voltage opposite to a charge polarity of the ion in said electrolytic solution.

6. An ionizing analysis apparatus according to claim 1, wherein said takeout means further comprises means for generating a Taylor cone by vibrating said tube so as to vibrate a liquid surface of said opening.

7. An ionizing analysis apparatus according to claim 1, wherein said takeout means further comprises means for bringing a liquid surface of said opening into contact with the tip of said needle by vibrating said tube so as to vibrate said liquid surface.

8. An ionizing analysis apparatus according to claim 1, wherein said takeout means further comprises means for temporarily bringing the tip of said needle into contact with or close to said electrolytic solution by moving said needle in the longitudinal direction thereof.

9. An ionizing analysis apparatus according to claim 1, wherein said takeout means further comprises vibrating means for vibrating said needle so as to temporarily bring the tip of said needle into contact with or close to said electrolytic solution.

10. An ionizing analysis apparatus according to claim 9, wherein said vibrating means is a ultrasonic vibrator.

11. An ionizing analysis apparatus according to claim 1, wherein at least a portion of the surface of said needle is coated with a material selected from the group consisting of dielectric materials, insulating materials, materials repellent to the electrolytic solution, and materials absorbing the electrolytic solution.

12. An ionizing analysis apparatus according to claim 1, wherein said needle has a constricted portion near a tip portion between the tip of said needle and a base portion of said needle.

13. An ionizing analysis apparatus which ionizes a sample material contained in an electrolytic solution in a chamber, emits thus obtained ion, and then detects thus emitted ion, said apparatus comprising:

a supply tube which supplies said electrolytic solution into said chamber and has an opening within said chamber;

a needle which is disposed in said tube, has a tip projecting into said chamber through said opening, and is movable in a longitudinal direction thereof; and a nozzle for jetting out a gas against the tip of said needle from a direction substantially orthogonal to the moving direction of said needle.

14. An ionizing analysis apparatus according to claim 13, further comprising means for applying a predetermined voltage to said needle, said predetermined voltage corresponding to a charge polarity of the ion in said electrolytic solution.

15. An ionizing analysis apparatus according to claim 13, further comprising means for intermittently emitting said gas.

16. An ionizing analysis apparatus according to claim 13, further comprising a skimmer disposed in said chamber so as to oppose to said nozzle across said needle and opening, said skimmer having an opening portion substantially at the center thereof and a gas emitting port, said gas emitting port being disposed around said opening portion so as to be directed toward said nozzle.

17. An ionizing analysis apparatus according to claim 13, further comprising means for applying a predetermined voltage to said needle, said predetermined voltage having a polarity opposite to a charge polarity of the ion in said electrolytic solution.

18. An ionizing analysis apparatus according to claim 13, further comprising means for generating a Taylor cone by vibrating said tube so as to vibrate a liquid surface of said opening.

19. An ionizing analysis apparatus according to claim 13, further comprising means for bringing a liquid surface of said opening into contact with the tip of said needle by vibrating said tube so as to vibrate said liquid surface.

20. An ionizing analysis apparatus according to claim 13, further comprising means for temporarily bringing the tip of said needle into contact with or close to said electrolytic solution by moving said needle in the longitudinal direction thereof.

21. An ionizing analysis apparatus according to claim 13, further comprising vibrating means for vibrating said needle so as to temporarily bring the tip of said needle into contact with or close to said electrolytic solution.

22. An ionizing analysis apparatus according to claim 21, wherein said vibrating means is a ultrasonic vibrator.

23. An ionizing analysis apparatus according to claim 13, wherein at least a portion of the surface of said needle is coated with a material selected from the group consisting of dielectric materials, insulating materials, materials repellent to the electrolytic solution, and materials absorbing the electrolytic solution.

24. An ionizing analysis apparatus according to claim 13, wherein said needle has a constricted portion near a tip portion between the tip of said needle and a base portion of said needle.

25. An ionizing analysis apparatus which ionizes a sample material contained in an electrolytic solution in a chamber, emits thus obtained ion, and then detects thus emitted ion, said apparatus comprising:

a supply tube which supplies said electrolytic solution into said chamber and has an opening within said chamber;

a first needle in which at least a tip thereof is disposed within said chamber;

a second needle which has a tip opposed to the tip of said first needle and is disposed within said tube so as to be relatively movable with respect to said first needle; and a nozzle for jetting out a gas against the tip of said second needle from a direction substantially orthogonal to the moving direction of said second needle.

26. An ionizing analysis apparatus according to claim 25, further comprising means for applying a predetermined voltage to said first needle, said predetermined voltage corresponding to a charge polarity of the ion in said electrolytic solution.

27. An ionizing analysis apparatus according to claim 25, further comprising means for intermittently emitting said gas.

28. An ionizing analysis apparatus according to claim 25, further comprising a skimmer disposed in said chamber so as to oppose to said nozzle across said first and second needles, said skimmer having an opening portion substantially at the center thereof and a gas emitting port, said gas emitting port being disposed around said opening portion so as to be directed toward said nozzle.

29. An ionizing analysis apparatus according to claim 25, further comprising means for applying a predetermined voltage between said first and second needles, said predetermined voltage having a polarity opposite to a charge polarity of the ion in said electrolytic solution.

30. An ionizing analysis apparatus according to claim 25, further comprising means for temporarily bringing the tip of said first needle into contact with or close to said electrolytic solution by moving said first needle in a longitudinal direction thereof.

31. An ionizing analysis apparatus according to claim 25, further comprising vibrating means for vibrating said first and second needles so as to temporarily bring the tip of said first needle into contact with or close to said electrolytic solution.

32. An ionizing analysis apparatus according to claim 31, wherein said vibrating means is a ultrasonic vibrator.

33. An ionizing analysis apparatus according to claim 25, wherein at least a portion of the surfaces of said first and second needles is coated with a material selected from the group consisting of dielectric materials, insulating materials, materials repellent to the electrolytic solution, and materials absorbing the electrolytic solution.

34. An ionizing analysis apparatus according to claim 25, wherein said first needle has a constricted portion near a tip portion between the tip of said first needle and a base portion of said first needle.

35. An ionizing analysis apparatus which ionizes a sample material contained in an electrolytic solution in a chamber, emits thus obtained ion, and then detects thus emitted ion, said apparatus comprising:

a supply tube which supplies the electrolytic solution into said chamber and has an opening within said chamber;

a needle disposed within said chamber;

takeout means for taking out a droplet of said electrolytic solution by said needle, wherein said takeout means comprises means for generating a Taylor cone by vibrating said supply tube so as to vibrate a liquid surface of said opening; and emitting means for emitting said droplet into said chamber by gas jetting out against said droplet taken out by said takeout means preferably with applying a predetermined voltage, corresponding to a charge polarity of said ion in said droplet taken out, to said needle.

36. An ionizing analysis apparatus which ionizes a sample material contained in an electrolytic solution in a chamber, emits thus obtained ion, and then detects thus emitted ion, said apparatus comprising:

a supply tube which supplies the electrolytic solution into said chamber and has an opening within said chamber;

a needle having a tip disposed within said chamber;

takeout means for taking out a droplet of said electrolytic solution by said needle wherein said takeout means comprises means for bringing a liquid surface of said opening into contact with said tip of said needle by vibrating said supply tube so as to vibrate said liquid surface; and emitting means for emitting said droplet into said chamber by gas jetting out against said droplet taken out by said takeout means preferably with applying a predetermined voltage, corresponding to a charge polarity of said ion in said droplet taken out, to said needle.

* * * * *